US008004700B2

(12) United States Patent  
Itoh et al.

(10) Patent No.: US 8,004,700 B2  
(45) Date of Patent: Aug. 23, 2011

(54) SERVER FOR COMBINING IMAGES, AND METHOD OF CONTROLLING SAME

(75) Inventors: Meiji Itoh, Kanagawa (JP); Hiroshi Minatogawa, Tokyo (JP); Yuko Suzuki, Tokyo (JP); Karin Kon, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 921 days.

(21) Appl. No.: 11/955,555

(22) Filed: Dec. 13, 2007

(65) Prior Publication Data  
US 2008/0144094 A1 Jun. 19, 2008

(30) Foreign Application Priority Data

Dec. 15, 2006 (JP) ................................ 2006-337697

(51) Int. Cl.  
*G06K 15/00* (2006.01)  
*H04N 1/387* (2006.01)

(52) U.S. Cl. ........................ 358/1.14; 358/1.18; 358/450

(58) Field of Classification Search ................. 358/1.14, 358/468, 434, 435, 436, 444, 404, 1.16, 1.18, 358/450  
See application file for complete search history.

(56) References Cited

U.S. PATENT DOCUMENTS

| 7,027,660 | B2 * | 4/2006 | Hersch et al. | 382/257 |
|---|---|---|---|---|
| 2002/0049847 | A1 * | 4/2002 | McArdle et al. | 709/227 |
| 2003/0167201 | A1 * | 9/2003 | Yamano | 705/10 |
| 2004/0021680 | A1 * | 2/2004 | Hara | 345/700 |
| 2004/0205138 | A1 * | 10/2004 | Friedman et al. | 709/206 |
| 2007/0064279 | A1 * | 3/2007 | Nishida | 358/462 |
| 2007/0065012 | A1 * | 3/2007 | Yamakado et al. | 382/182 |
| 2008/0077883 | A1 * | 3/2008 | Kim et al. | 715/835 |

FOREIGN PATENT DOCUMENTS

JP 10320576 A 12/1998

* cited by examiner

*Primary Examiner* — Jerome Grant, II  
(74) *Attorney, Agent, or Firm* — Sughrue Mion, PLLC

(57) ABSTRACT

It is so arranged that a mount image suited to a user photo image can be selected. To accomplish this, a creator accesses a scrapbook server using a computer and executes a simulation for creating a scrapbook by affixing part images such as photographic images and decorative images to an image of a paper mount on the display screen of the computer. When a user photo image and a mount image are selected, thumbnail images of decorative images recommended as decorative images for the user photo image and mount image are displayed in a small window. The creator selects a desired decorative image from among the thumbnail images of the recommended decorative images. The selected decorative image is displayed on a scrapbook edit image.

9 Claims, 29 Drawing Sheets

*Fig. 15*

USER PHOTO LAYER DATA

| ORDER ID | 1234 |
|---|---|
| LAYER No. | 1 |
| PART ID | A-4486-R |
| ORIGINAL IMAGE POSITION | http://xxx.yyy.zz/xxxx222.jpg |
| KIND | USER PHOTO IMAGE |
| PRICE | ¥20 |
| THICKNESS INFORMATION | A-4486-R-1234-01.thk |
| COLOR INFORMATION | SEPIA PROCESSING |
| SHAPE PLACEMENT INFORMATION | A-4486-R-1234-01.pat |
| IMAGE INFORMATION | A-4486-R-1234-01.bmp |
| CANDIDATE CONDITION | COLOR FEATURE OR KEYWORD (oooo) |
| EDITED USER PHOTO | |

Fig.16

| MOUNT TABLE | | |
|---|---|---|
| MOUNT | COLOR FEATURE | KEYWORD |
| 1 : MOUNT A | YCbCr_A | KW_A |
| 2 : MOUNT B | YCbCr_B | KW_B |
| 3 : MOUNT C | YCbCr_C | KW_C |
| 4 : MOUNT D | YCbCr_D | KW_D |
| 5 : MOUNT E | YCbCr_E | KW_E |

Fig.17

| DECORATION TABLE | | |
|---|---|---|
| DECORATION | COLOR FEATURE | KEYWORD |
| 1 : DECORATION F | YCbCr_F | KW_F |
| 2 : DECORATION G | YCbCr_G | KW_G |
| 3 : DECORATION H | YCbCr_H | KW_H |
| 4 : DECORATION I | YCbCr_I | KW_I |
| 5 : DECORATION J | YCbCr_J | KW_J |

*Fig. 18*

| MATERIAL TABLE | | |
|---|---|---|
| MATERIAL | COLOR FEATURE | KEYWORD |
| 1: MATERIAL F | YCbCr_F | KW_F |
| 2: MATERIAL G | YCbCr_G | KW_G |
| 3: MATERIAL H | YCbCr_H | KW_H |
| 4: MATERIAL I | YCbCr_I | KW_I |
| 5: MATERIAL J | YCbCr_J | KW_J |

```
  HOW TO CREATE A SCRAPBOOK

1. MAKE SURE THAT PHOTO, PAPER MOUNT AND PARTS
   ARE READY

2. AFFIX PHOTO IMAGE TO MOUNT

3. AFFIX PART A TO MOUNT

4. AFFIX PART B TO MOUNT SO AS TO OVERLAP PORTION
   OF PHOTO IMAGE AND PORTION OF PART A
```

230

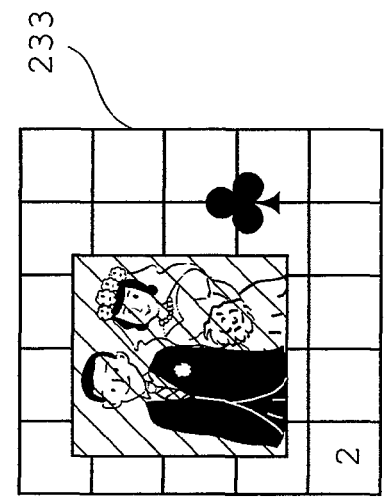
*Fig. 34C*
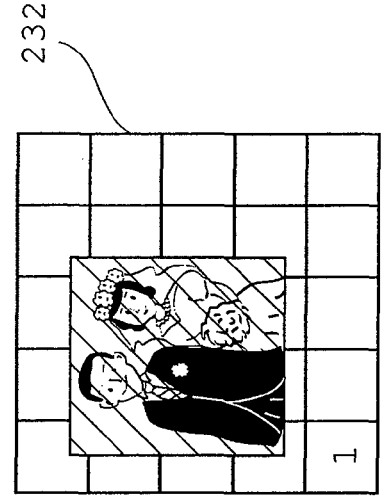
*Fig. 34B*
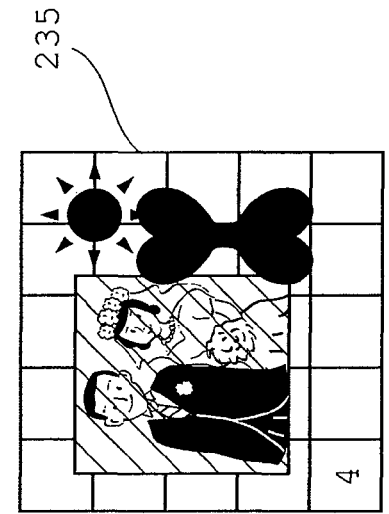
*Fig. 34E*
*Fig. 34A*
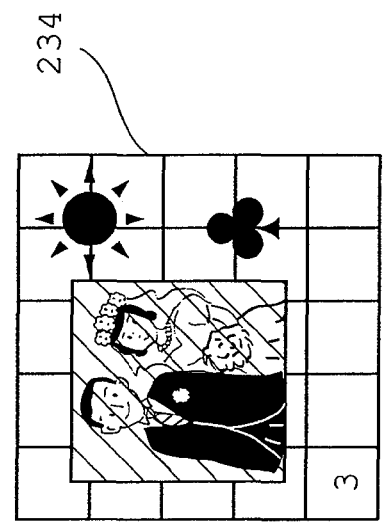
*Fig. 34D*

SERVER FOR COMBINING IMAGES, AND METHOD OF CONTROLLING SAME

BACKGROUND OF THE INVENTION

1. Field of the Invention

This invention relates to a server for combining images and to a method of controlling this server.

2. Description of the Related Art

In a case where a color image is superimposed on a background image, a color image suited to the color tone of the background image is selected automatically in one example of the prior art (see the specification of Japanese Patent Application Laid-Open No. 10-320576).

However, this example of the prior art only takes into consideration two types of images, namely the background image and the color image superimposed on the background image.

SUMMARY OF THE INVENTION

Accordingly, an object of the present invention is to propose images that are suitable for combining to a user as recommended images in a case where three types of images are combined.

According to the present invention, the foregoing object is attained by providing server for combining images, the server comprising: a user image identification data receiving device for receiving data identifying a user image, which has been selected by a client computer from a number of user images obtained by sensing the images of subjects and has been transmitted from the client computer; a mount image search device for finding, by a search among a number of mount images, a plurality of mount images recommended as mount images of the user image identified by the user image identification data received by the user image identification data receiving device; a mount image data transmitting device for transmitting mount image data, which represents the plurality of mount images found by the mount image search device, to the client computer; a mount identification data receiving device for receiving mount identification data transmitted from the client computer, this data identifying a mount image that has been selected by the client computer from among the plurality of mount images, in response to transmission of the mount image data from the mount image data transmitting device to the client computer; a part image search device for finding, by a search among a number of part images, a plurality of part images recommended as part images to be combined with an image that is a combination of the user image identified by the user image identification data received by the user image identification data receiving device and the mount image identified by the mount identification data received by the mount identification data receiving device; and a part image data transmitting device for transmitting part image data, which represents the plurality of part images found by the part image search device, to the client computer.

The present invention also provides a method of controlling the above-described server for combining images. More specifically, the present invention provides a method of controlling a server for combining images, comprising the steps of: receiving, by a user image identification data receiving device, user image identification data for identifying a user image, which has been selected by the client computer from among a number of user images obtained by sensing the images of subjects and has been transmitted from the client computer; finding, by a mount image search device, by a search among a number of mount images, a plurality of mount images recommended as mount images of a user image represented by user image identification data received by the user image data receiving device; transmitting to the client computer, by a mount image data transmitting device, mount image data representing the plurality of mount images found by the mount image search device; receiving, by a mount identification data receiving device, mount identification data transmitted from the client computer, this data identifying a mount image that has been selected by the client computer from among the plurality of mount images, in response to transmission of the mount image data from the mount image data transmitting device to the client computer; finding, by a part image search device, by a search among a number of part images, a plurality of part images recommended as part images to be combined with an image that is a combination of the user image identified by the user image identification data received by the user image identification data receiving device and the mount image identified by the mount identification data received by the mount identification data receiving device; and transmitting to the client computer, by a part image data transmitting device, part image data representing the plurality of part images found by the part image search device.

In accordance with the present invention, user image data is transmitted from an image combining server to a client computer. User images represented by the user image data received by the client computer are displayed on the display screen of a display unit of the client computer. A desired user image is selected at the client computer from among a number of user images. Date identifying the user image selected at the client computer is transmitted to and received by the image combining server. A plurality of mount images recommended as mount images of the user image identified by the user image identification data are found at the image combining server. Mount image data representing the plurality of mount images found is transmitted from the image combining server to the client computer. A plurality of mount images suitable for use as mount images of the user image being displayed are displayed on the display screen of the display unit of the client computer. A desired mount image is selected by the user of the client computer from among the displayed plurality of mount images. Data identifying the selected mount image is transmitted from the client computer to the image combining server. In order to select a part image to be combined with the combined image composed of the user image and the selected mount image, a plurality of suitable part images are found among a number of part images. Image data representing the found plurality of part images is transmitted from the image combining server to the client computer. The user of the client computer is capable of selecting a desired part image from among a plurality of part images recommended as part images to be combined with the mount image and user image. Thus, in a case where a mount image and a part image are combined with a user image, a mount image and a part image that are suitable for combining can be selected.

The server may further comprise a user image data receiving device, responsive to application of image transformation processing such as cropping and color conversion by the client computer to a user image that is identified by the user image identification data receiving device, for receiving the user image data that has undergone the image transformation processing transmitted from the client computer. In this case, the mount image search device finds, by a search among a number of mount images, a plurality of mount images recommended as mount images of a user image represented by the user image data that has undergone the image transformation processing received at the user image data receiving device, and the part image search device finds, by a search among a number of part images, a plurality of part images recommended as part images to be combined with an image that is a combination of the user image represented by user image data received by the user image data receiving device and the mount image identified by the mount identification data receiving device.

The server may further comprise a user image keyword receiving device for receiving a user image keyword transmitted from the client computer, wherein the user image keyword has been input by the user of the client computer with regard to a user image selected by the client computer and has been transmitted from the client computer to the server. In this case, keywords have been assigned to respective mount images of the number of mount images. Based upon a user image keyword received by the user image keyword receiving device and mount keywords that have been assigned to mount images, the mount image search device finds, by a search, a plurality of mount images recommended as mount images of the user image identified by the user image data received by the user image identification data receiving device. Keywords have been assigned to respective part images of the number of part images. Based upon a user image keyword received by the user image keyword receiving device, a mount keyword that has been assigned to a mount image and part keywords that have been assigned part images, the part image search device finds, by a search, a plurality of part images recommended as part images to be further combined with the paper mount.

The server may further comprise a mount image data receiving device, responsive to application of image transformation processing such as cropping and color conversion by the client computer to a mount image that has been selected by the client computer from among a plurality of mount images, for receiving the mount image data that has undergone the image transformation processing transmitted from the client computer. In this case, the part image search device finds, by a search among a number of part images, a plurality of mount images recommended as part images to be combined with an image that is a combination of the user image identified by the user image identification data received by the user image identification data receiving device and the mount image received by the mount image data receiving device.

The server may further comprise a mount keyword receiving device for receiving a mount keyword transmitted from the client computer, wherein the mount keyword has been input by the user of the client computer with regard to a mount image selected by the client computer and has been transmitted from the client computer to the server. In this case, keywords are assigned to respective part images of the number of mount images. Based upon a mount keyword received by the mount keyword receiving device, a user image keyword received by the user image keyword receiving device and a part keyword assigned to a part image, the part image search device finds, by a search, a plurality of part images recommended as parts images to be further combined with the mount image.

The server may further comprise a part image data receiving device, responsive to application of image transformation processing such as cropping and color conversion or designation of position by the client computer to a part image represented by part image data that has been transmitted to the client computer by the part image data transmitting device, for receiving part image data that has undergone the image transformation processing, or designated position data, transmitted from the client computer.

The server may further comprise a part keyword receiving device for receiving a part keyword, which corresponds to the part image, transmitted from the client computer; and a part image keyword assigning device for assigning the part keyword, which has been received by the part keyword receiving device, to the corresponding part image.

The mount image search device finds, as a recommended mount image among a number of mount images, a mount image having an average value of color that approximates an average value of color of a user image identified by user image identification data received by the user image identification data receiving device.

Further, the part image search device finds, as a recommended part image from among a number of part images, a part image having an average value of color that approximates an average value of color of a user image identified by user image identification data received by the user image identification data receiving device and an average value of color of a mount image identified by mount identification data received by the mount identification data receiving device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 15 illustrates an example of layer data;

FIG. 16 illustrates an example of a mount table;

FIG. 17 illustrates an example of a decoration table;

FIG. 18 illustrates an example of a material table;

FIGS. 34A to 34E illustrate an example of a pictorial procedural manual; and

DESCRIPTION OF THE PREFERRED EMBODIMENT

A preferred embodiment of the present invention will now be described in detail with reference to the accompanying drawings.

Figure 1:
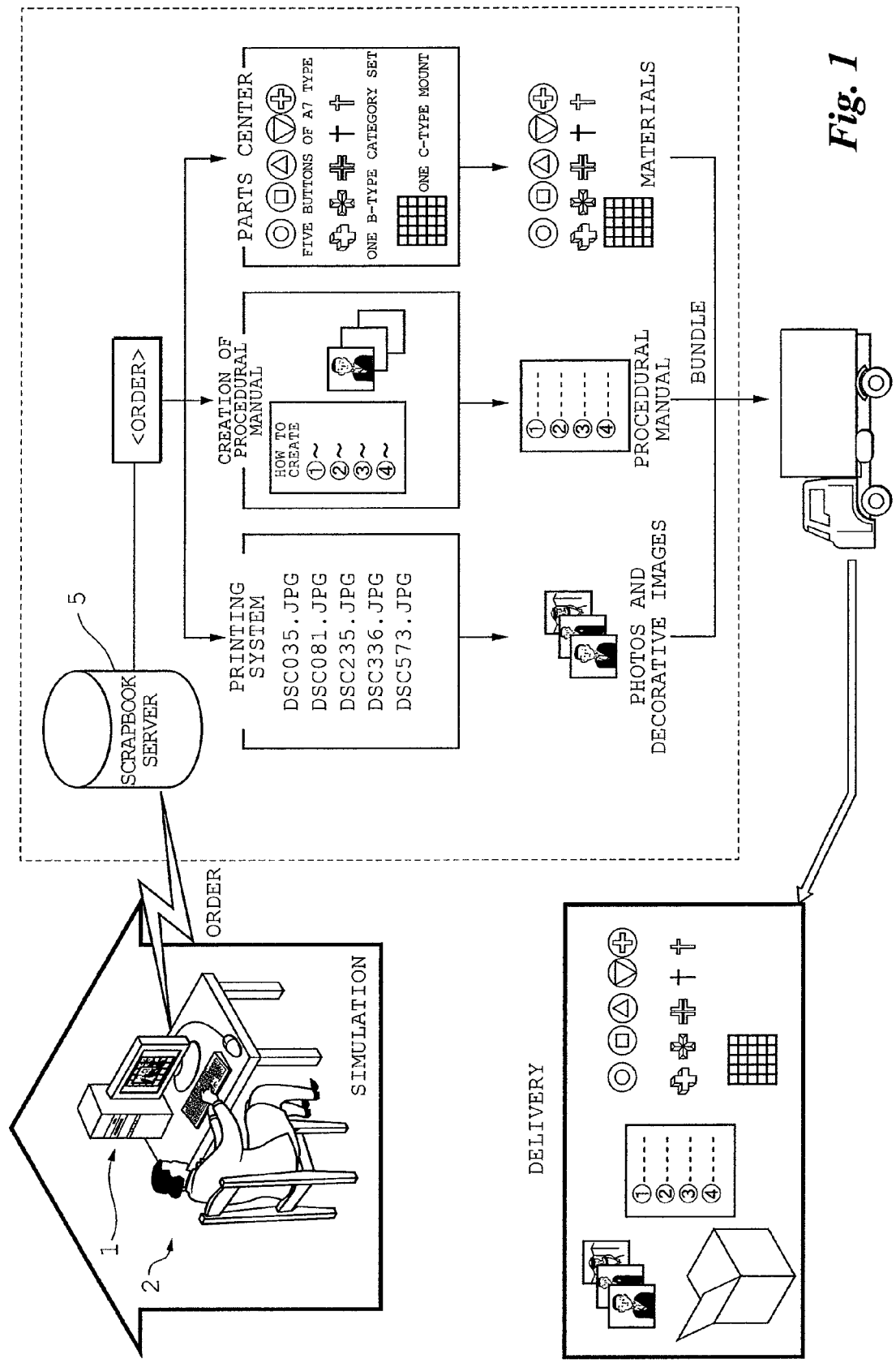
FIG. 1 illustrates an overview of a scrapbook system.

FIG. 1 illustrates an overview of a scrapbook order system according to this embodiment.

In the scrapbook order system according to this embodiment, a creator 2 attempting to actually create a scrapbook is capable of performing a simulation for creating a scrapbook using creator's own computer 1. The creator 2 access a scrapbook server 5 using the computer 1. When this is done, the scrapbook server 5 sends the computer 1 of the creator 2 part image data representing part images for executing the simulation of scrapbook creation. Examples of the part images are a paper mount image, photographic image, decorative images such as marks, and material images representing three-dimensional materials such as a ribbon or button.

Upon receiving the part image data, the computer 1 of the creator 2 executes the scrapbook creating simulation on the display screen on the computer 1 using the part images represented by the part image data. Whenever a part image is selected and the placement thereof decided, layer data is transmitted from the computer 1 of the creator 2 to the scrapbook server 5 in succession.

Upon receiving the layer data transmitted from the computer 1 of the creator 2, the scrapbook server 5 creates a procedural manual (an explanation manual for actually creating a scrapbook) in line with the simulation of the creator 2 based upon the received layer data. Further, photographs and decorative images necessary in order to create the scrapbook are printed, and material such as ribbons and buttons is extracted in a parts center. Parts such as the paper mount and photographs for creating the scrapbook and the procedural manual (explanation manual) for creating the scrapbook are packaged and the package is delivered to the residence of creator 2 from the scrapbook center.

While looking at the procedural manual and using the parts contained in the package, the creator 2 creates the scrapbook by affixing the photographs, printed decorative images and material such as ribbons and buttons to the mount in the manner that was carried out in the simulation.

Figure 2:
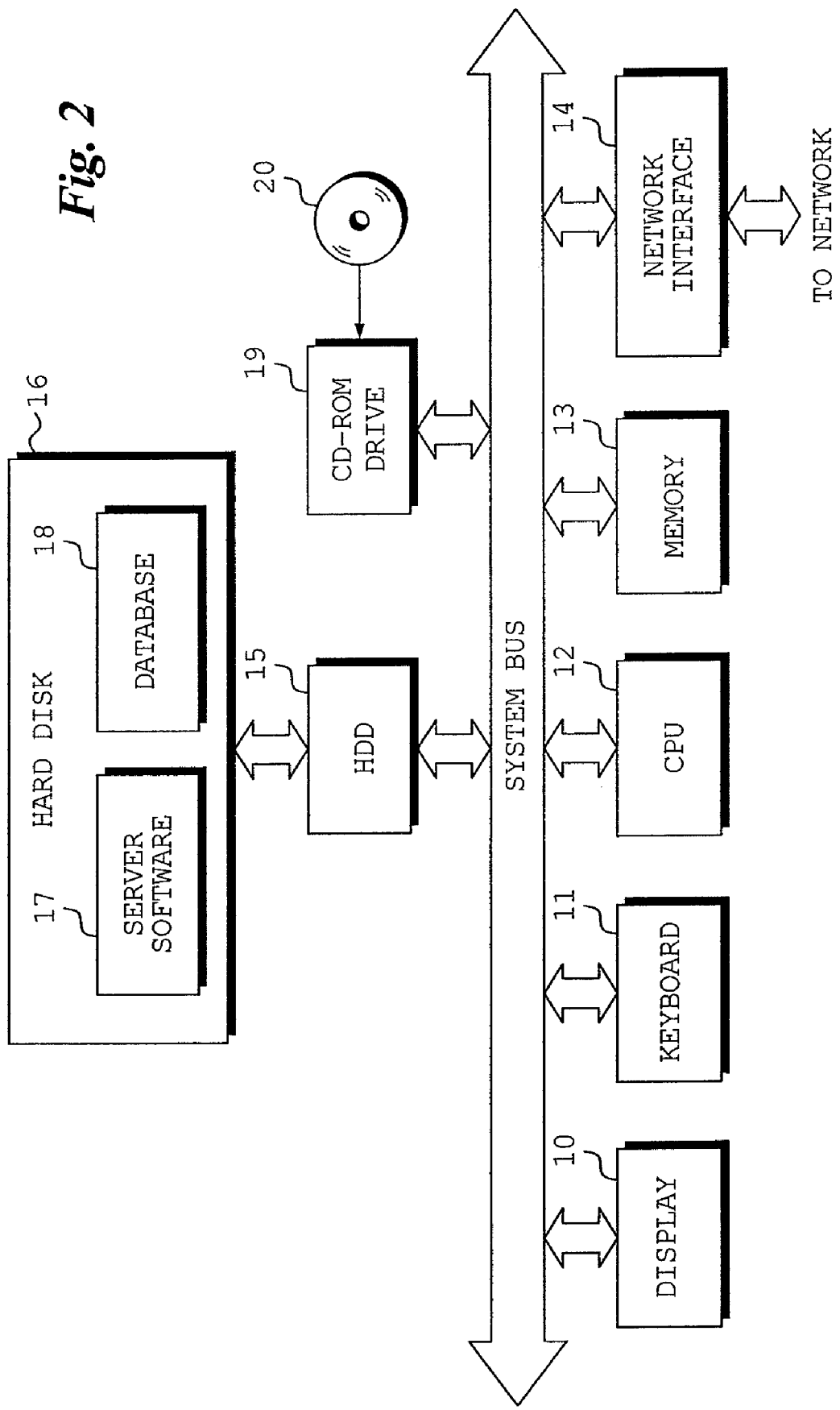
FIG. 2 is a block diagram illustrating the electrical configuration of a scrapbook server.
Figure 3:
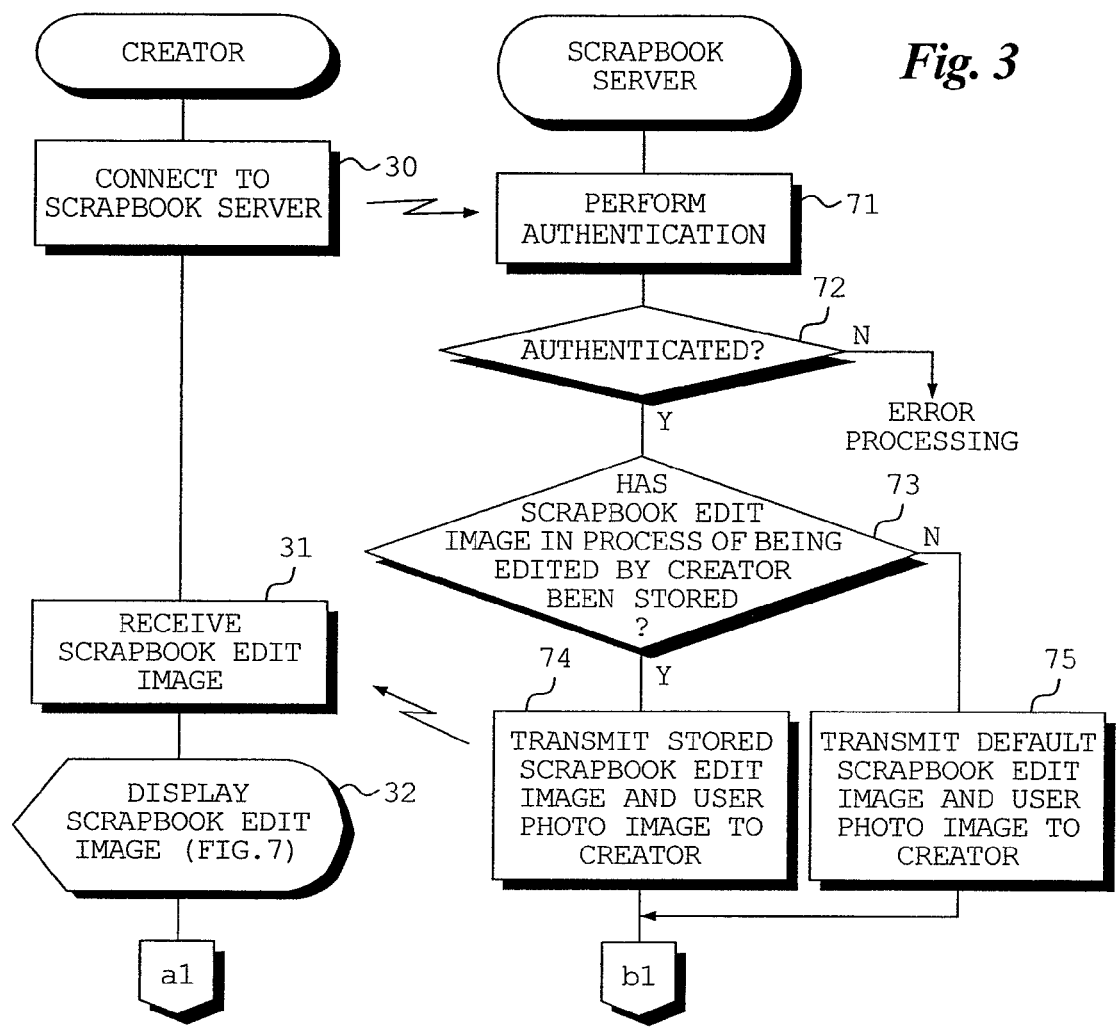
FIGS. 3 to 7 are flowcharts illustrating processing executed between the computer of a user and a scrapbook server.

FIG. 2 is a block diagram illustrating the electrical configuration of the scrapbook server 5.

The operation of the overall scrapbook server 5 is controlled by a CPU 12.

The scrapbook server 5 includes a CD-ROM (Compact Disk-Read-Only Memory) drive 19. When a CD-ROM 20 on which server software 17 for controlling operation (described later) has been stored is loaded in the CD-ROM drive 19, the server software 17 is installed on a hard disk 16. In addition to the server software 17, a database 18 has been stored on the hard disk 16. The server software 17, etc., stored on the hard disk 16 is accessed by a hard-disk drive 15.

The scrapbook server 5 includes a display unit 10 for displaying images, a keyboard 11 for inputting commands, etc., a memory 13 for storing data, etc., temporarily, and a network interface 14 for connecting to a network.

FIGS. 3 to 7 are flowcharts illustrating processing executed between the computer 1 of the creator 2 and the scrapbook server 5. These flowcharts show the processing of the simulation for creating a scrapbook in the manner described above.

The computer 1 of the creator 2 and the scrapbook server 5 are connected (step 30) and the creator 2 is authenticated at the scrapbook server 5 (step 71). When the creator has been authenticated ("YES" at step 72), the scrapbook server 5 determines whether a scrapbook edit image, namely an image whose editing by the creator 2 is in progress, has been stored (step 73).

An image displayed on the display screen of the computer 1 of the creator 2 in a simulation is a scrapbook edit image. During or after a simulation, data representing the scrapbook edit image can be stored in the scrapbook server 5, and a simulation can be carried out using the stored scrapbook edit image. Whether a scrapbook edit image has been stored or not is determined for this reason. If a scrapbook edit image has been stored ("YES" at step 73), the data representing the stored scrapbook edit image and data representing a number of user photo images already uploaded to the scrapbook server 5 by the creator 2 is transmitted from the scrapbook server 5 to the computer 1 of the creator 2 (step 74). If a scrapbook edit image has not been stored ("NO" at step 73), then data representing a default scrapbook edit image and data representing a number of user photo images already uploaded to the scrapbook server 5 by the creator 2 is transmitted from the scrapbook server 5 to the computer 1 of creator 2 (step 75).

Upon receiving data representing a scrapbook edit image (step 31), the computer 1 of the creator 2 displays the scrapbook edit image on the display screen of the computer 1 (step 32). In this embodiment, it is assumed that the default scrapbook edit image is displayed.

Figure 8:
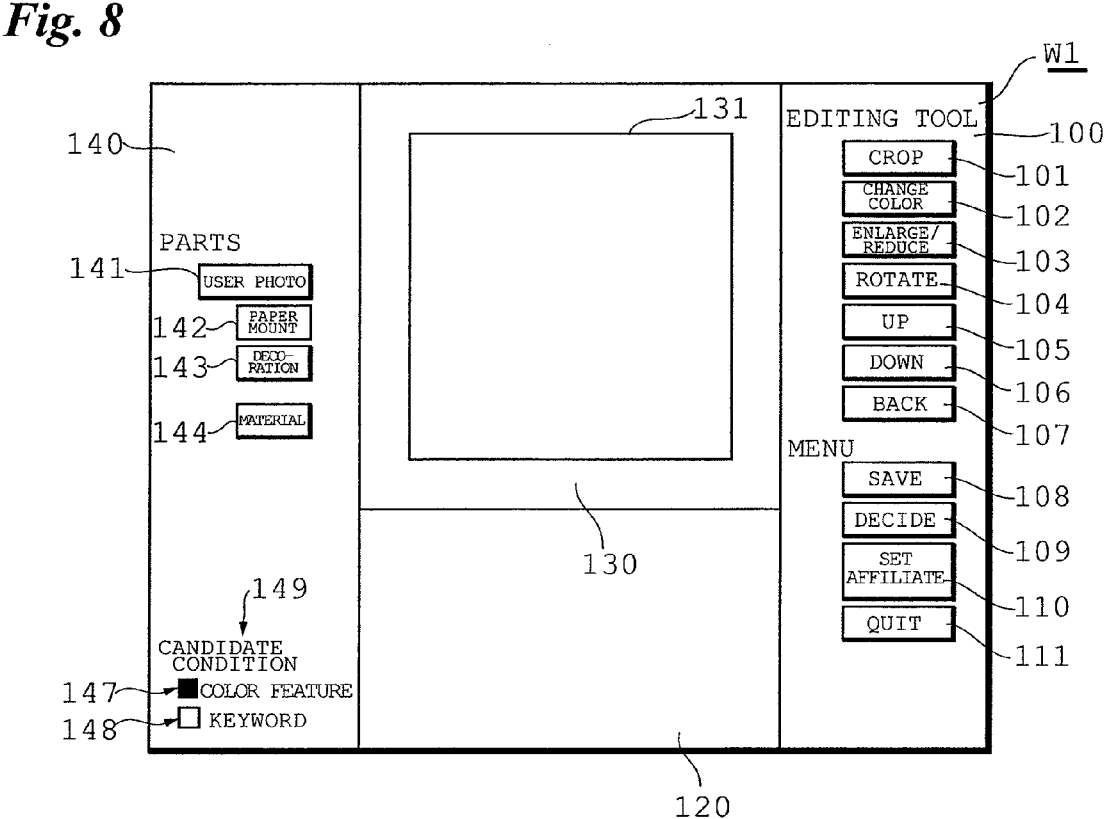
FIGS. 8 to 14 show examples of windows displayed on the display screen of a computer.

FIG. 8 illustrates an example of a window W1 displayed on the display screen of the computer 1 of creator 2.

The window W1 is formed to have a part selection area 140 on the left side, a command issuing area 100 on the right side, a part-color specifying area 120 at bottom center, and a scrapbook edit image display area 130 at the center.

The part selection area 140 includes a user photo area 141, a mount area 142, a decoration area 143 and a material area 144.

The user photo area 141 is an area clicked by the creator in a case where a photograph of the user (creator) is selected. If the user photo area 141 is clicked, user photo images are displayed in list form on the display screen of the display unit. The user photo images are represented by a number of items of user photo image data transmitted from the scrapbook server 5 in the manner described above. A desired user photo image is selected from among the user photo images displayed in list form.

Figure 11:
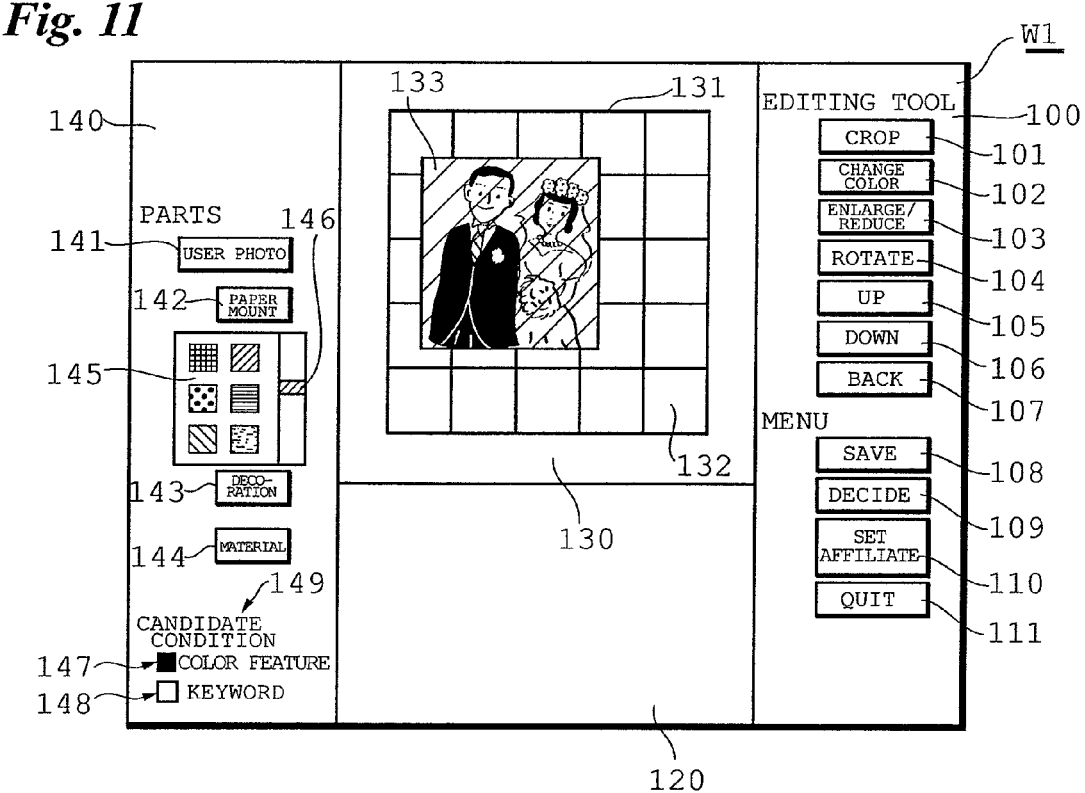

The mount area 142 is an area clicked by the creator if a paper mount is selected. If the mount area 142 is clicked, a small window 145 appears under the mount area 142, as illustrated in FIG. 11. Thumbnail mount images representing samples of paper mounts are displayed within the small window 145 that has appeared. A scroll bar 146 is formed on the right side of the small window 145. New thumbnail mount images appear in the small window 145 in response to the scroll bar 146 being moved up or down. Clicking a thumbnail mount image that is being displayed in the small window 145 selects the mount image. In this embodiment, thumbnail mount images recommended as mount images of a selected user photo image are displayed in the small window 145. The creator 2 is capable of selecting a mount image that is suited to the user photo image.

Figure 12:
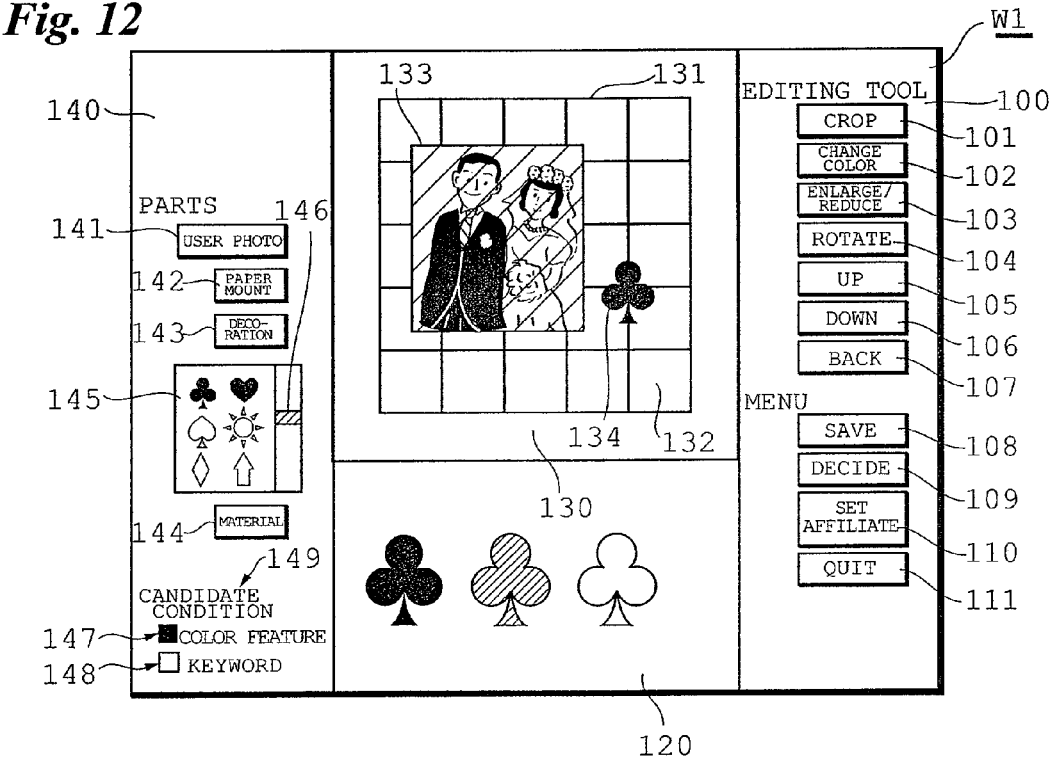

The decoration area 143 is an area clicked by the creator if a decoration image is selected. If the decoration area 143 is clicked, a small window 145 appears under the decoration area 143, as illustrated in FIG. 12. Thumbnail decoration images are displayed within the small window 145 that has appeared. Clicking a thumbnail decoration image that is being displayed in the small window 145 selects the mount image. Thumbnail decoration images recommended as decoration images of both a selected user photo image and selected mount image are displayed in the small window 145. The creator 2 is capable of selecting a decoration image that is suited to the user photo image.

Figure 14:
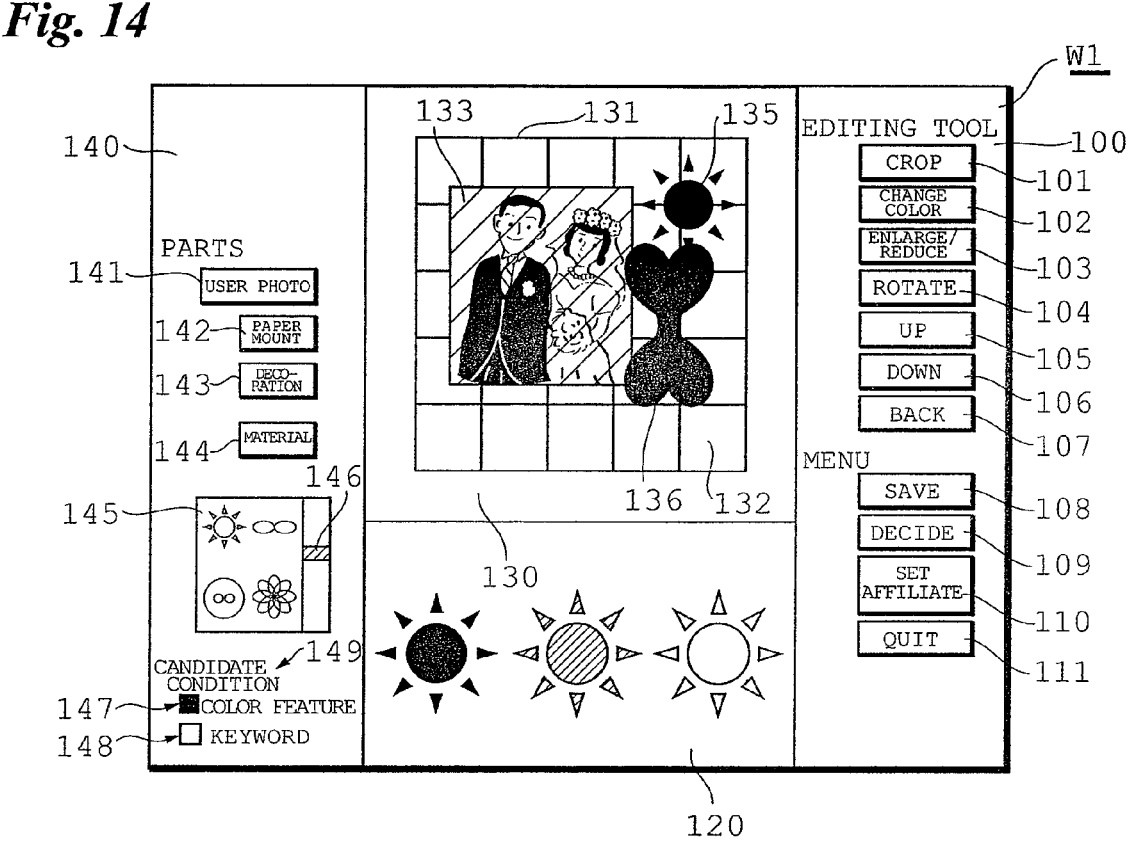

The material area 144 is an area clicked by the creator in a case where the creator selects a decoration consisting of material having thickness, such as a button or ribbon, other than paper. If the material area 144 is clicked, the small window 145 appears under the material area 144, as illustrated in FIG. 14. Images of materials are displayed in the small window 145 that has appeared. Clicking a material image being displayed in the small window 145 selects the material. With regard also to the images of the materials, thumbnail material images recommended as decorative images of both a selected user photo image and selected mount image are displayed in the small window 145. The creator 2 is capable of selecting a material image that is suited to the user photo image and mount image.

The part selection area 140 further includes an area 149 for selecting a candidate condition. In this embodiment, recommended mount images, etc., are displayed in the small window 145 so that the creator 2 can select a mount image, decorative image or mount image that are suited to the user photo image selected by the creator 2 as described above. A condition for finding the recommended mount image, etc., is a candidate condition. Candidate conditions include a color feature and a keyword. The color feature is a candidate condition for a case where a recommended mount image, etc., is found based upon a feature of the color of the user photo image selected. The keyword is a candidate condition for a case where a recommended mount image, etc., is found based upon a keyword that has been assigned to the user photo image selected.

Characters reading "COLOR FEATURE" and characters reading "KEYWORD" are displayed in the area 149 for selecting the candidate condition. Check buttons 147 and 148 are displayed on the left side of the characters reading "COLOR FEATURE" and characters reading "KEYWORD". If a color feature is to be selected as the candidate condition, the check box 147 is checked by the creator 2. If a keyword is to be selected as the candidate condition, the check box 148 is checked by the creator 2.

The command issuing area 100 includes a crop area 101, a color-change area 102, an enlarge/reduce area 103, a rotate area 104, an UP area 105, a DOWN area 106, a BACK area 107, a save area 108, a decide area 109, an affiliate setting area 110 and a quit area 111.

The crop area 101 is an area clicked in a case where a portion of a part is cropped. A part image to be cropped is selected after the crop area 101 is clicked, and the portion to be cropped is designated by a cursor, thereby deciding the portion cropped. The color-change area 102 is an area clicked when a color is to be changed in a case where a plurality of colors are available for the same part. If a part image is selected after the color-change area 102 is clicked, the color of the selected part image changes. Naturally, it may be so arranged that a color pallet is displayed and a color designated from among the colors on the displayed color pallet. The enlarge/reduce area 103 is an area clicked in a case where a part image is enlarged or reduced in size. If a part image is selected after the enlarge/reduce area 103 is clicked, the selected part image is enlarged or reduced in size. It may be so arranged that an enlarge icon or reduce icon is displayed in order to specify enlargement or reduction.

The rotate area 104 is an area clicked in a case where a part image is rotated. By selecting a part image and dragging it after the rotate area 104 is clicked, the part image is rotated. The UP area 105 is clicked when a part image in a lower layer is made an upper layer. If a part image is clicked after the UP area 105 is clicked, this part image becomes one layer higher than the present layer. The DOWN area 106 is clicked when a part image in an upper layer is made a lower layer. If a part image is clicked after the DOWN area 106 is clicked, this part image becomes one layer lower than the present layer. The BACK area 107 restores the part image to the default. If a part image is selected after the BACK area 107 is clicked, the selected part image is restored to the default image.

The save area 108 is clicked when data representing a scrapbook image edited in the manner described above is stored in the scrapbook server 5. The decide area 109 is clicked whenever editing of a single part, such as selection, placement or color change, etc., of the part, is decided. The affiliate setting area 110 is clicked in a case where a third-party user utilizes a scrapbook edit image that has been created by the creator 2. The quit area 111 is clicked when editing is finished.

When a plurality of colors have been assigned to a selected part, parts having these plurality of colors are displayed in the part-color specifying area 120. The creator selects the image of the part having the desired color from among the plurality of colors.

The scrapbook edit image display area 130 is an area in which a scrapbook edit image currently undergoing editing is displayed. If data representing a default scrapbook edit image is transmitted to the computer 1 of creator 2, as described above, a simple border 131 is displayed in the scrapbook edit image display area 130 in the manner illustrated in FIG. 8. The border 131 itself need not be displayed, as a matter of course.

Figure 9:
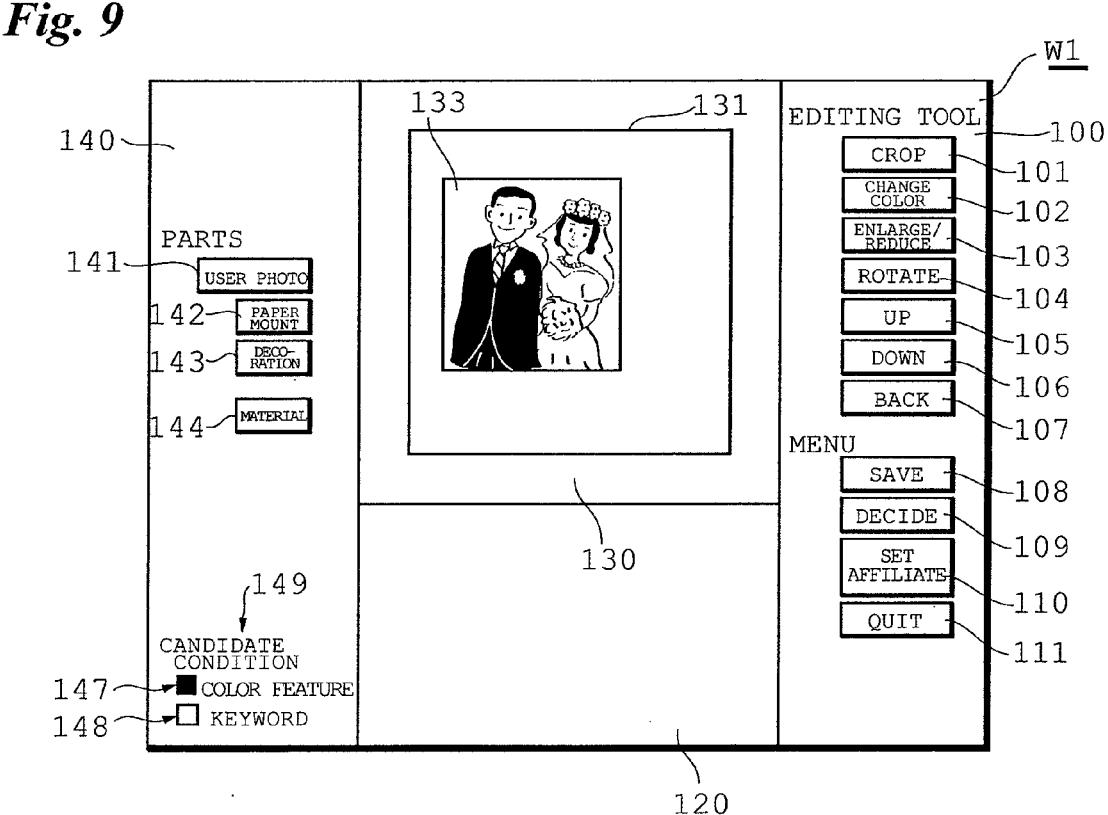
Figure 10:
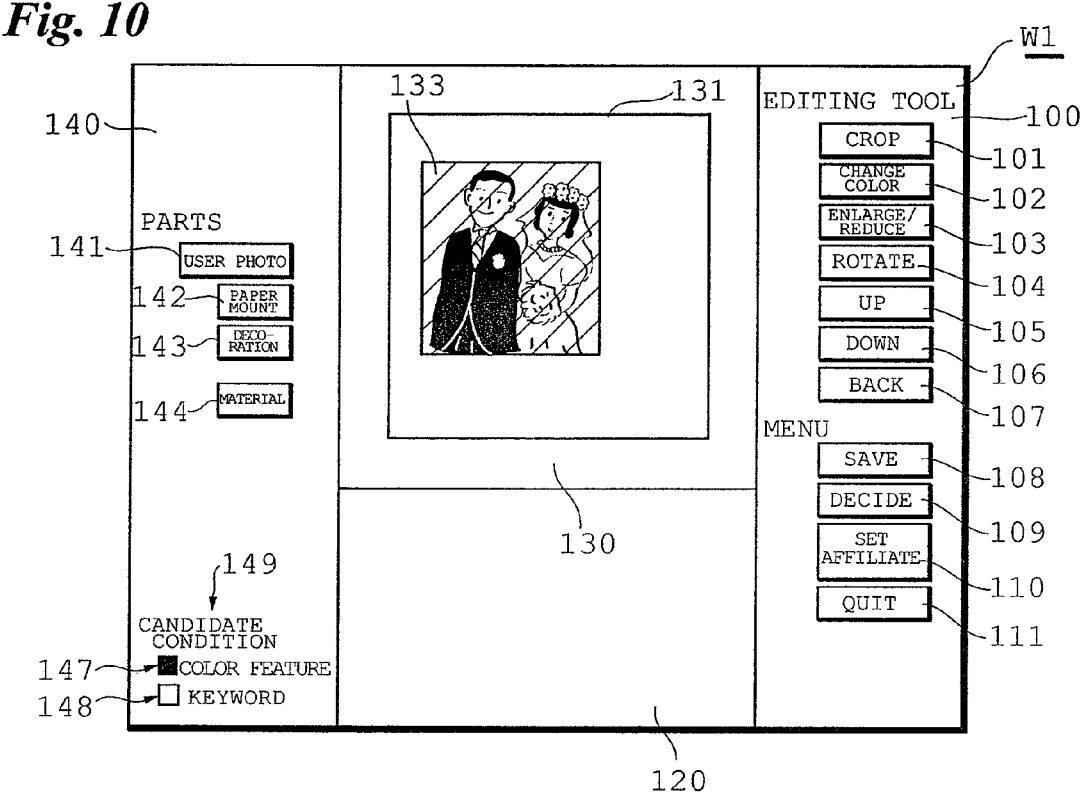

If the user photo area 141 is clicked by the creator 2 with the window W1 of FIG. 8 being displayed on the display screen (step 33 in FIG. 4), a new window for selecting a user photo image in the manner described above appears. A desired user photo image is selected by the creator from within the new window (step 34 in FIG. 4). As illustrated in FIG. 9, a selected user photo image 133 is displayed as a scrapbook edit image 131 in the scrapbook edit image display area 130 (step 35 in FIG. 4). Next, the creator subjects the selected user photo image 133 to editing such as cropping, change of color, enlargement/reduction and rotation, etc. (step 36 in FIG. 4). Here it will be assumed that the color of the selected user photo image 133 has been changed. The change in color is expressed by hatching, as illustrated in FIG. 10. It goes without saying that the editing of a user photo image is not limited to a change in color and may be other processing such as cropping, enlargement/reduction or rotation, etc.

Figure 4:
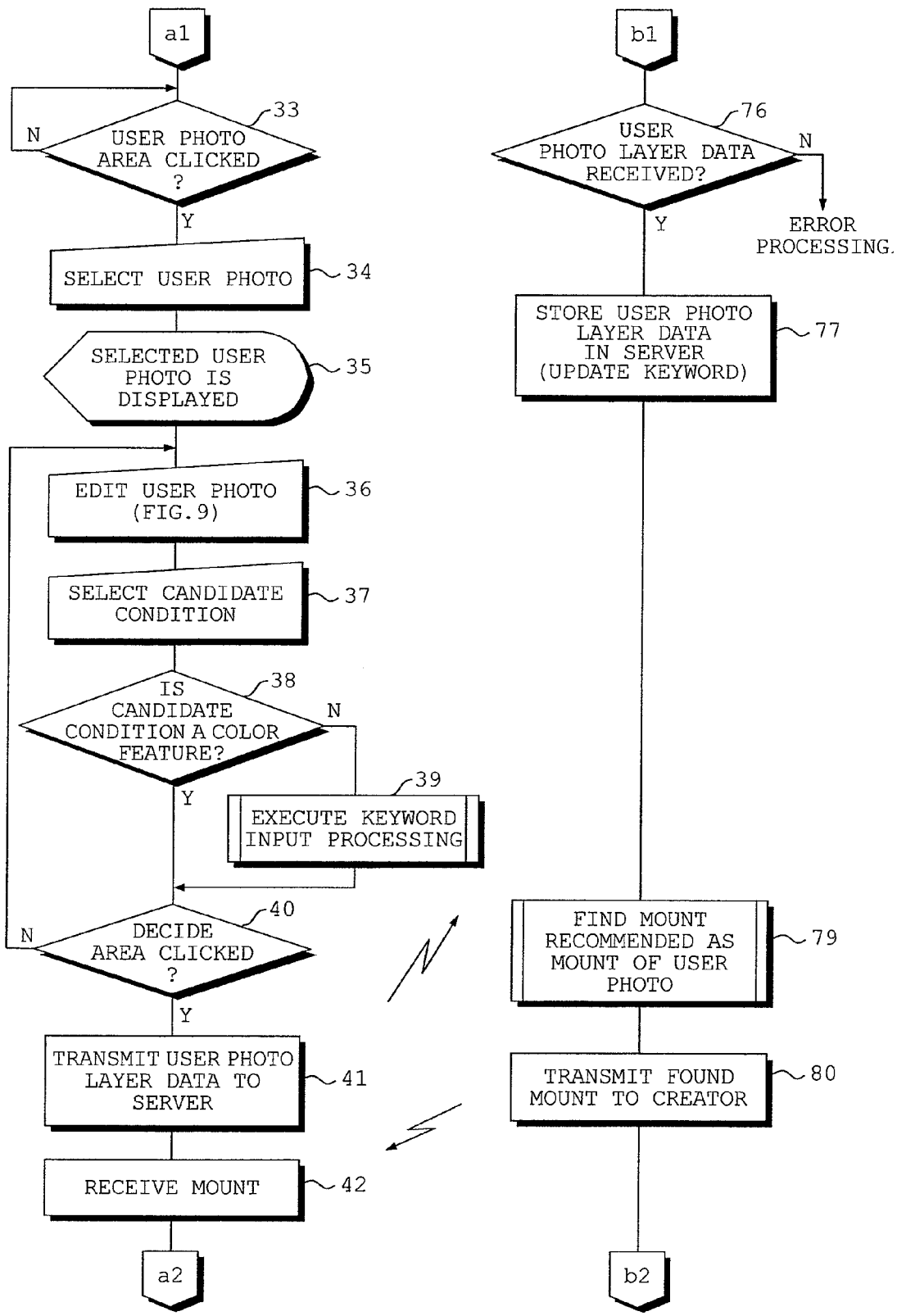

Next, the check box 147 or 148 is checked by the creator 2, as mentioned above, whereby the candidate condition is selected (step 37 in FIG. 4). Whether the candidate condition is a color feature or a keyword is discriminated (step 38 in FIG. 4). If the candidate condition is not a color feature (i.e., if it is a keyword) ("NO" at step 38 in FIG. 4), keyword input processing is executed. Keyword input processing will be described in detail later. If the candidate condition is a color feature ("YES" at step 38 in FIG. 4), then the processing of step S39 is skipped.

The decide area 109 is clicked by the creator 2 ("YES" at step 40 in FIG. 4). When this is done, user photo layer data indicating editing information, etc., regarding the selected user photo is transmitted from the computer 1 of creator 2 to the scrapbook server 5 (step 41 in FIG. 4).

Upon receiving the user photo layer data ("YES" at step 76 in FIG. 4), the user photo layer data is stored in the scrapbook server 5 (step 77 in FIG. 4). Further, if the layer data includes a keyword, the keyword of the corresponding user photo image is updated. On the basis of the user photo layer data, a mount image recommended as a mount image of the user photo image is found at the scrapbook server 5 (step 79 in FIG. 4). It goes without saying that a number of mount images have been stored in the scrapbook server 5. Processing for finding a recommended mount image will be described in detail later. Image data representing the mount image found as the recommended mount image is transmitted from the scrapbook server 5 to the computer 1 of creator 2 (step 80 in FIG. 4).

Image data representing the mount image transmitted from the scrapbook server 5 is received by the computer 1 of creator 2 (step 42 in FIG. 4).

Figure 5:
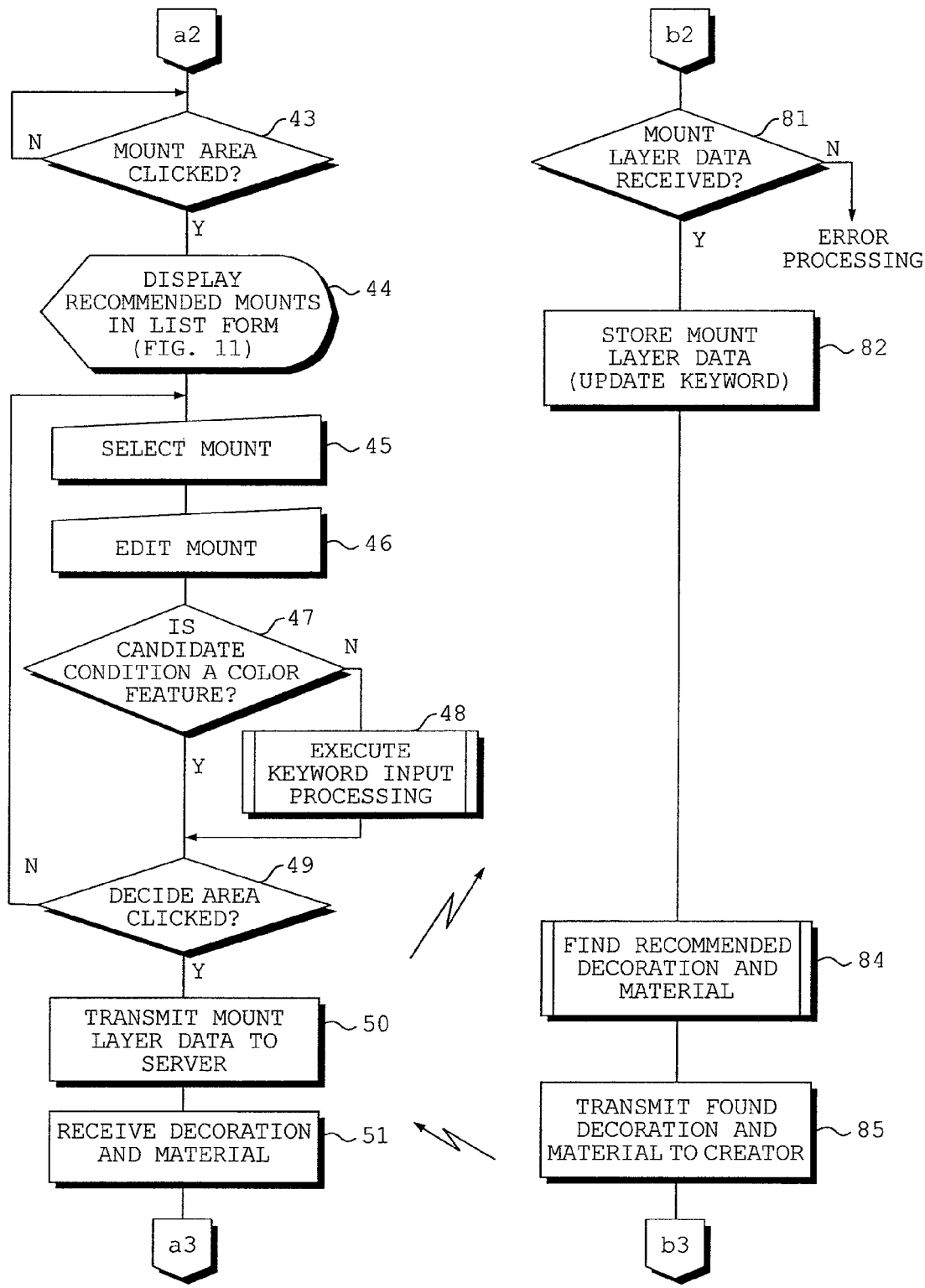

The mount area 142 is clicked by the creator 2 (step 43 in FIG. 5). When this is done, the small window 145 appears below the mount area 142, as shown in FIG. 11. Thumbnail images of mount images recommended as mount images of the user photo image 133 selected and edited by the creator 2 are displayed in list form in the small window 145 (step 44 in FIG. 5). A desired mount image is selected by the creator 2 from among the mount images being displayed in the small window 145 (step 45 in FIG. 5). When this is done, the selected mount image 132 is displayed with the scrapbook edit image 131. The selected mount image 132 also is edited if necessary (step 45 in FIG. 5).

With regard also to decorative images, a recommended decorative image is found, as described above. To achieve this, whether the candidate condition is a color feature or a keyword is determined (step 47 in FIG. 5). If the candidate condition is a keyword ("YES" at step 47 in FIG. 5), keyword input processing is executed (step 48 in FIG. 5). If the candidate condition is a color feature ("NO" at step 47 in FIG. 5), then the processing of step 48 is skipped. If the decide area 109 is clicked ("YES" at step 49 in FIG. 5), the mount layer data is transmitted from the computer 1 of creator 2 to the scrapbook server 5 (step 50 in FIG. 5).

When the mount layer data transmitted from the computer 1 of creator 2 is received by the scrapbook server 5 ("YES" at step 81 in FIG. 5), the received mount layer data is stored in the scrapbook server 5 (step 82 in FIG. 5). Further, if the layer data includes a keyword, the keyword of the corresponding mount image is updated. On the basis of the mount layer data, etc., a decorative image and material image recommended as the edited user photo image and edited mount image are found (step 84 in FIG. 5). The image data representing the found decorative image and the image data representing the found material image is transmitted from the scrapbook server 5 to the computer 1 of creator 2 (step 85 in FIG. 5).

The image data representing the decorative image and the image data representing the material image transmitted from the scrapbook server 5 is received by the computer 1 of creator 2 (step 51 in FIG. 5).

Figure 6:
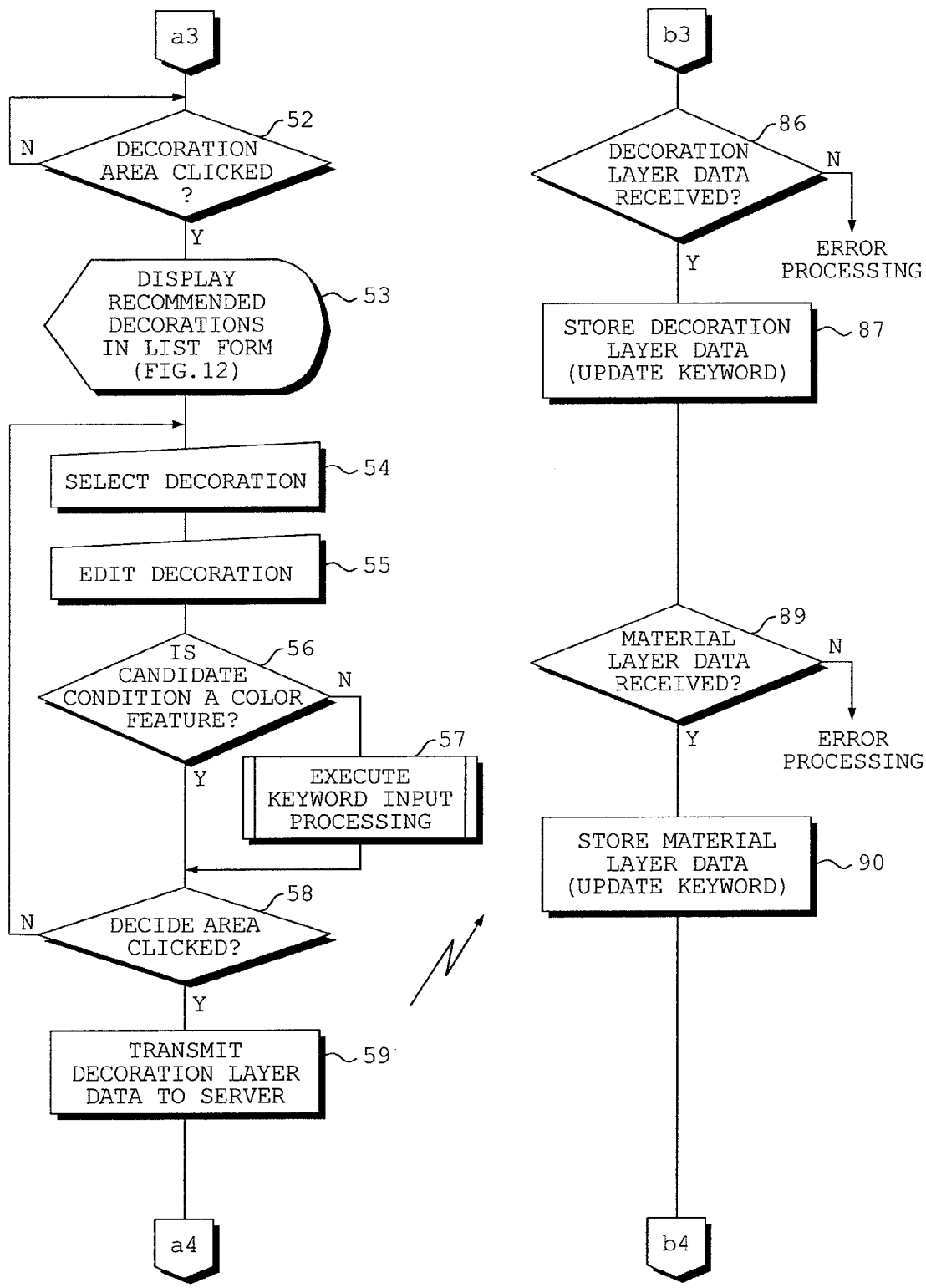

The decoration area 93 in window W1 is clicked by the creator 2 ("YES" at step 52 in FIG. 6). When this is done, the small window 145 appears below the decoration area 93, as illustrated in FIG. 12. Thumbnail images of recommended decorative images are displayed in list form in the small window 145 (step 53 in FIG. 6). A decorative image is selected from within the small window 145 (step 54 in FIG. 6). The selected decorative image 134 is displayed with the scrapbook edit image 131, as illustrated in FIG. 12. The selected decorative image 134 is edited (step 55 in FIG. 6). Whether the candidate condition is a color feature is determined again (step 56 in FIG. 6). If the candidate condition is a keyword ("NO" at step 56 in FIG. 6), keyword input processing is executed (step 57 in FIG. 6). If the decide area 109 is clicked ("YES" at step 58 in FIG. 6), layer data regarding the selected decorative image is transmitted to the scrapbook server 5 (step 59 in FIG. 6).

When the decorative layer data transmitted from the computer 1 of creator 2 is received by the scrapbook server 5 ("YES" at step 86 in FIG. 6), the received decorative layer data is stored in the scrapbook server 5 (step 87 in FIG. 6). Further, if the layer data includes a keyword, the keyword of the corresponding decorative image is updated.

Figure 13:
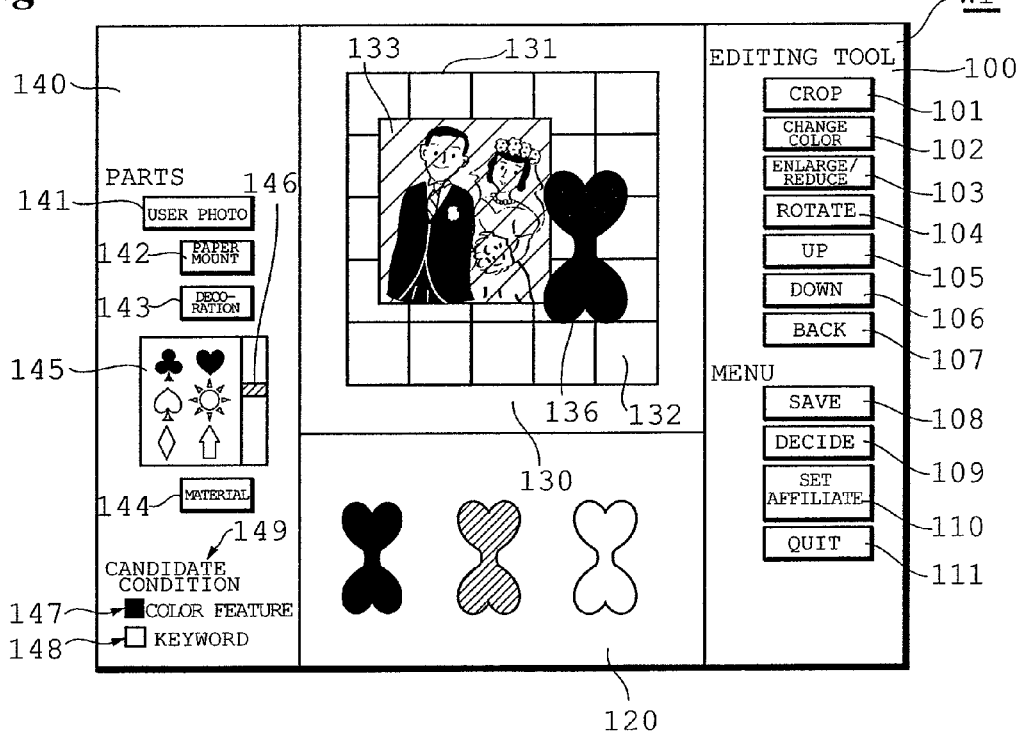

The decorative image can also be placed on a decorative image already selected. By way of example, after the decorative image 134 has been selected and placed on the scrapbook edit image 131, as shown in FIG. 12, a decorative image 136 may also be superimposed on the decorative image 134, as illustrated in FIG. 13. Decorative images can thus be superimposed (this is not limited to decorative images).

If the material area 144 is clicked, the small window 145 appears below the material area 144, as illustrated in FIG. 14 (step 60 in FIG. 7). Thumbnail images of material images recommended as materials of the user photo image and mount image are displayed in list form in the small window 145 (step 67 in FIG. 7). A material is selected from within the small window 145 (step 62 in FIG. 14) and the selected material image is displayed with the scrapbook edit image 131, as illustrated in FIG. 14. The selected material image is edited (step 62 in FIG. 7). The candidate condition is checked again (step 63 in FIG. 7). If the candidate condition is a keyword ("NO" at step 63 in FIG. 7), keyword input processing is executed (step 64 in FIG. 7). If the decide area 109 is clicked ("YES" at step 65 in FIG. 7), material layer data is transmitted from the computer 1 of the creator 2 to the scrapbook server 5 (step 66 in FIG. 7).

When the material layer data is received by the scrapbook server 5 ("YES" at step 89 in FIG. 6), the received material layer data is stored in the scrapbook server 5 (step 90 in FIG. 6). If the layer data includes a keyword, then the keyword of the corresponding material is updated.

Figure 7:
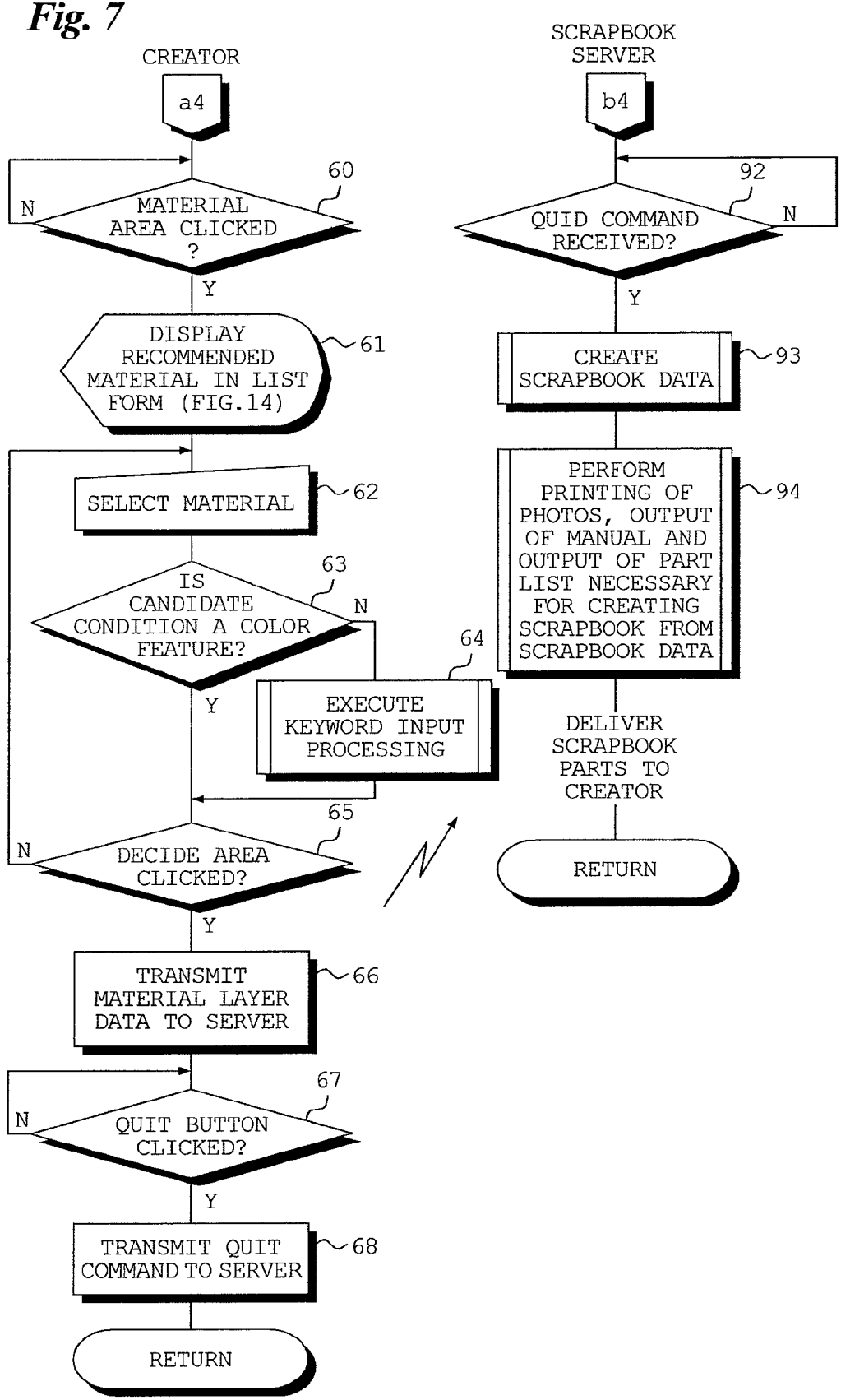

The quit area 111 in window W1 is clicked by the creator 2 ("YES" at step 67 in FIG. 7). A quit command is transmitted from the computer 1 of the creator to the scrapbook server 5 (step 68 in FIG. 7).

Upon receiving the quit command (step 92 in FIG. 7), the scrapbook server 5 creates scrapbook data using layer data that has been stored (step 93 in FIG. 7). Printing of photographs, output of a procedural manual and output of a parts list, etc., necessary for a scrapbook are performed using the created scrapbook data (step 94 in FIG. 7). The paper mount, photographs, decorative images and material, etc. necessary for the scrapbook are packaged and delivered to the residence of the creator 2. While looking at the procedural manual and using the parts contained in the package, the creator 2 creates the scrapbook in the manner that was simulated.

FIG. 15 illustrates an example of user photo layer data. FIG. 15 is an example of user photo layer data. This layer data is generated for every single part selected by the user, as described above.

The user photo layer data includes an order ID, layer number, part ID, original image position, kind, price, thickness information, color processing, shape placement information, image information candidate condition and user photo image data after editing. If editing has not been performed, the user photo image data does not include user photo layer data. With regard to layer data other than user photo layer data, the data is included in similar fashion.

The order ID is for identifying an order and is assigned on a per-order basis. By adopting part images selected as described above as layers and superimposing these layers, scrapbook edit images are generated one after another. The layer number is a number for identifying the layer. The layer number of the mount is 0. The original image position indicates the location at which the part image has been stored. The kind indicates the type of part. The price is the fee to use the part. If the image is the user image, then the price includes the printing fee. The thickness information is information indicating the actual thickness of the part. If the part has been subjected to color processing, then color processing indicates the content of this processing. The shape placement information is information indicating the placement position of the part. The image information indicates the pixel level serving as the image of the part. The candidate condition indicates the candidate condition selected by the creator 2. If, in a case where a keyword has been set as the candidate condition, a keyword has been input, the layer data will also include the keyword, as will be described later. In a case where a user photo image has been edited, the user photo image after editing indicates image data representing the user photo image after the editing thereof.

FIGS. 16, 17 and 18 illustrate examples of a mount table, decoration table and material table, respectively. The mount table, decoration table and material table have all been stored in the scrapbook server 5.

As shown in FIG. 16, the mount table is composed of combinations of a number of mount images that have been stored in the scrapbook server 5, color features of respective ones of the number of mount images, and keywords that have been assigned to respective ones of the number of mount images. By selecting a mount, the color feature and keyword corresponding to the selected mount are read from the table. A recommended mount image is found as the mount image of a user photo image in the manner described above using the color feature and keyword read from the table. If the mount image has been edited, the color feature is re-calculated from the edited mount image, although the keyword is not changed.

Similarly, as shown in FIG. 17, the decoration table also is composed of combinations of a number of decorative images that have been stored in the scrapbook server 5, color features of respective ones of the number of decorative images, and keywords that have been assigned to respective ones of the number of decorative images. As shown in FIG. 18, the material table also is composed of combinations of a number of material images that have been stored in the scrapbook server 5, color features of respective ones of the number of material images, and keywords that have been assigned to respective ones of the number of material images. Both decorative images and material images that are recommended for a user photo image and mount image selected by the creator 2 are found utilizing a color feature or keyword. With regard to user photo images as well, a table in which color features and keywords are associated with the user photo images in the same manner as the above-described mount table and decoration table has been stored in the scrapbook server 5.

Figure 19:
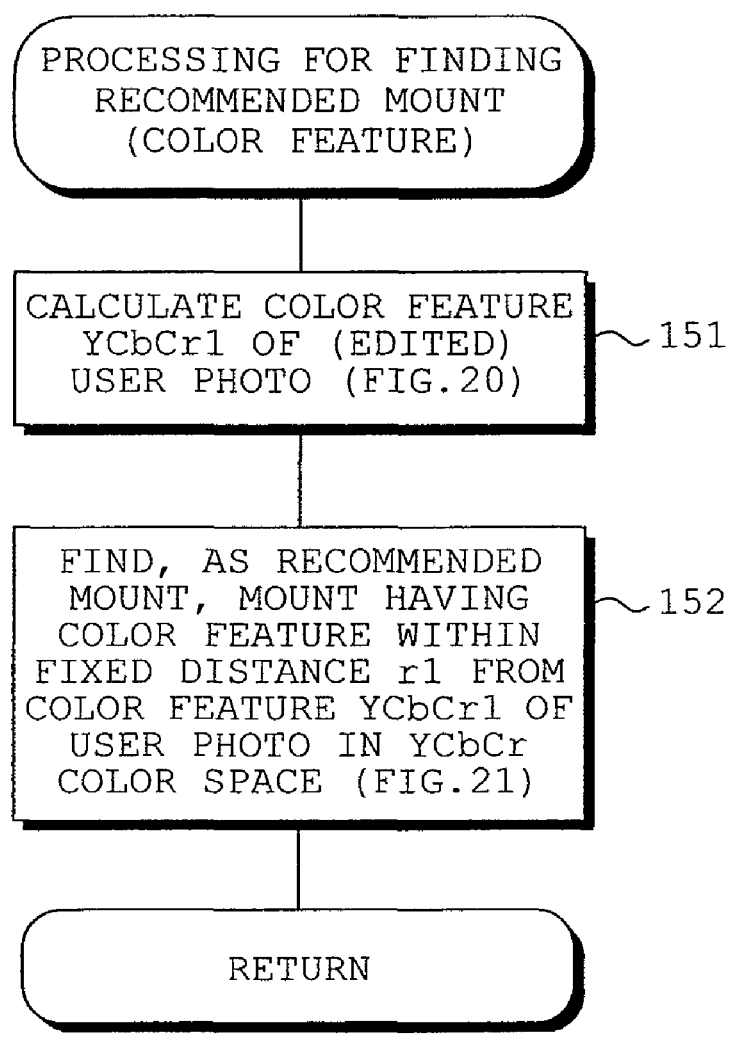
FIG. 19 is a flowchart illustrating processing for finding a recommended mount.

FIG. 19 is a flowchart illustrating processing (the processing of step 79 in FIG. 4) for finding a recommended mount in a case where a candidate condition is a color feature.

First, a color feature YCbCr1 of a selected user photo image is calculated (step 151). It goes without saying that if the user photo image has been edited, the color feature YCbCr1 of the edited user photo image is calculated.

Figure 20:
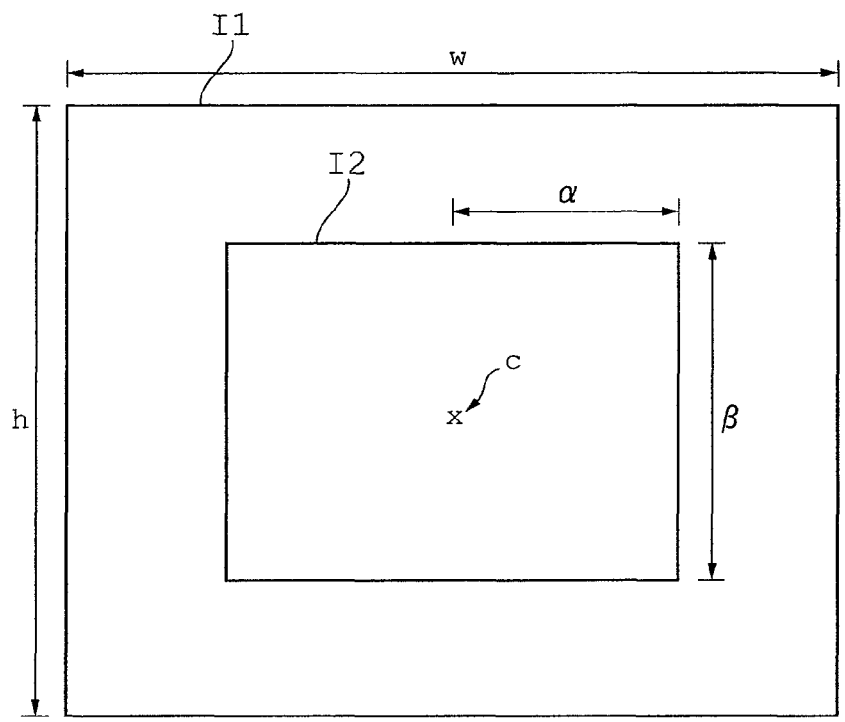
FIG. 20 illustrates an example of a user photo image.

FIG. 20 illustrates an example of a user photo image I1 that has been selected. Let c represent the center of the user photo image I1, which has a width w and a height h. An image portion 12 within a fixed distance $\alpha$ from the center c in the width direction and a fixed distance $\beta$ from the center c in the height direction is detected. Here $\alpha<w/2$, $\beta<h/2$ holds. Average values of each of a luminance value Y and color difference values Cb and Cr of the detected image portion 12 become the color feature YCbCr1 of the user photo image.

If, when the color feature YCbCr1 of the user photo image is calculated, the calculated color feature YCbCr1 is placed in YCbCr color space, a mount having a color feature that falls within a fixed distance r1 from the color feature YCbCr1 is found as a recommended mount (step 152).

Figure 21:
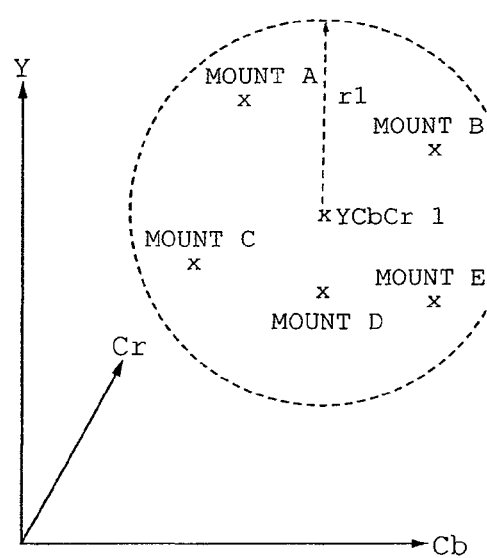
FIG. 21 illustrates YCbCr color space.

FIG. 21 illustrates the relationship between YCbCr color space and the color feature YCbCr1 of a user photo image.

As mentioned above, the color feature YCbCr1 of the user photo image is placed in YCbCr color space. A mount image having a color feature that falls within distance r1 from the color feature YCbCr1 becomes a mount image recommended as the mount image of the user photo image.

Figure 22:
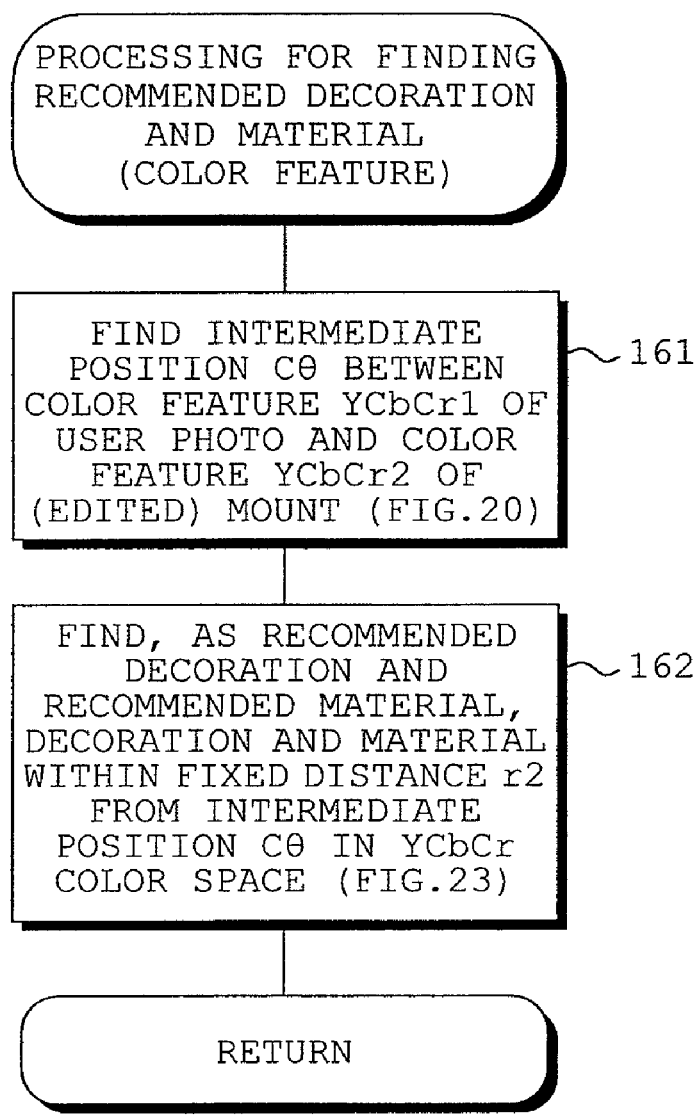
FIG. 22 is a flowchart illustrating processing for finding a recommended decoration and a recommended material.
Figure 23:
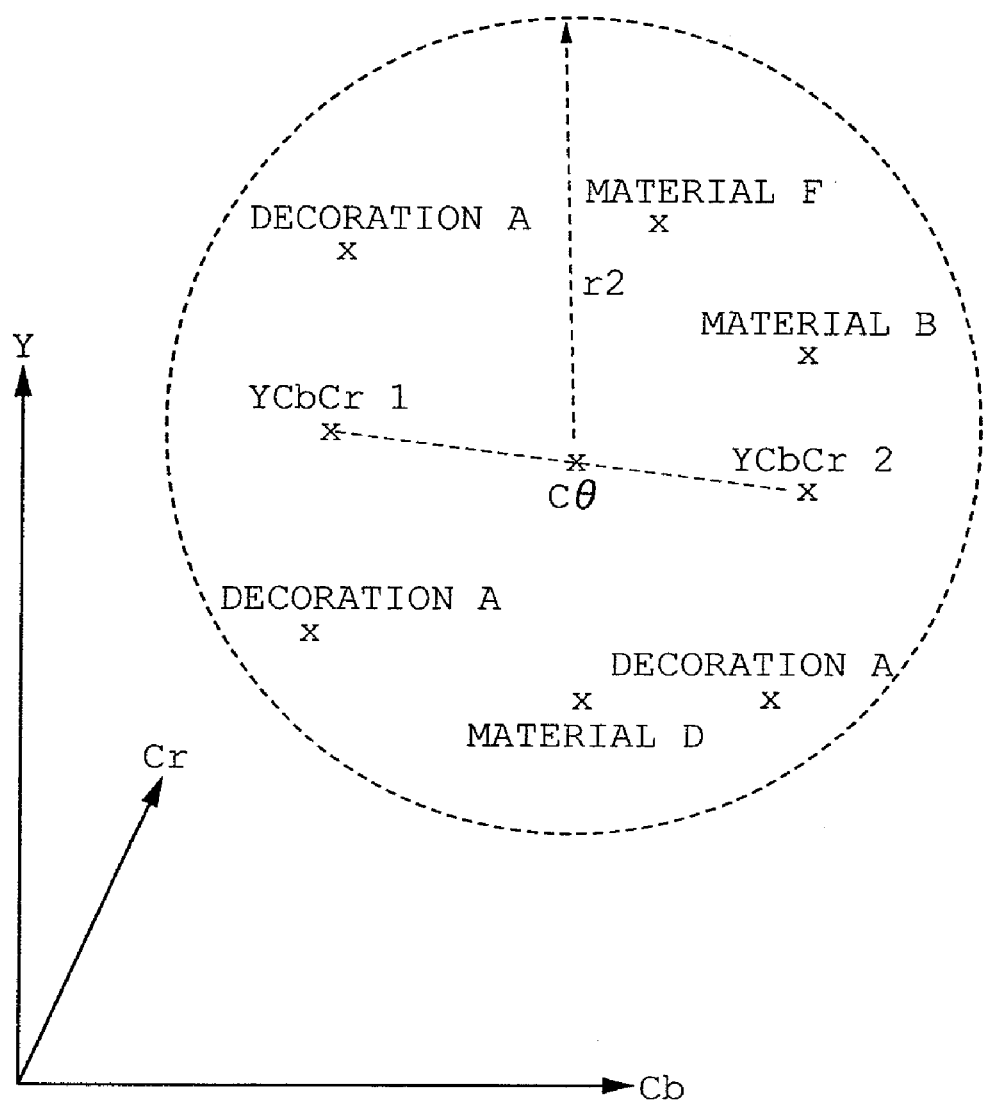
FIG. 23 illustrates YCbCr color space.

FIG. 22 is a flowchart illustrating processing (the processing of step 84 in FIG. 5) for finding a recommended decorative image and material image in a case where the candidate condition is a color feature. FIG. 23 illustrates YCbCr color space.

A color feature YCbCr2 of a selected mount image is calculated in addition to the color feature YCbCr1 of the user photo image. If the mount image has been edited, then the color feature YCbCr2 after editing is calculated. An intermediate position $c\theta$ between the color feature YCbCr1 of the user photo image and the color feature YCbCr2 of the mount image is calculated in YCbCr color space (step 161). A decorative image and a material image having color features that fall within a fixed distance r2 from the calculated intermediate position $c\theta$ are found as the recommended decorative image and material image (step 162).

Figure 24:
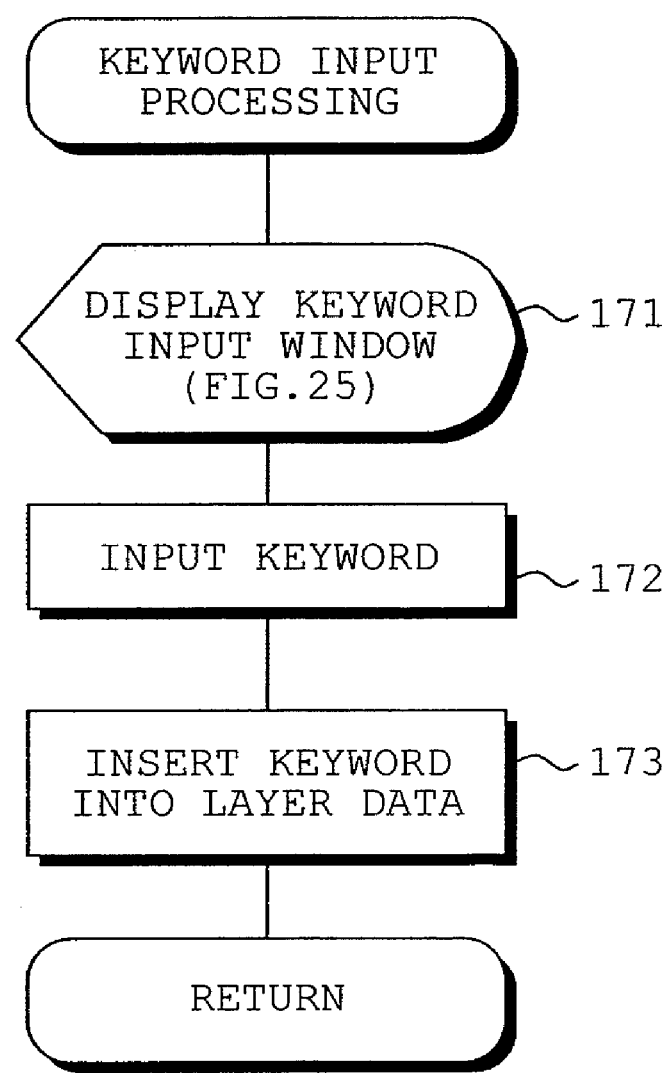
FIG. 24 is a flowchart illustrating keyword input processing.

FIG. 24 is a flowchart illustrating keyword input processing (the processing of step 39 in FIG. 4, step 48 in FIG. 5, step 57 in FIG. 6 and step 64 in FIG. 7).

In a case where the candidate condition is a keyword, the creator 2 can be input a corresponding keyword for every selected user photo image, mount image, decorative image and material image.

Figure 25:
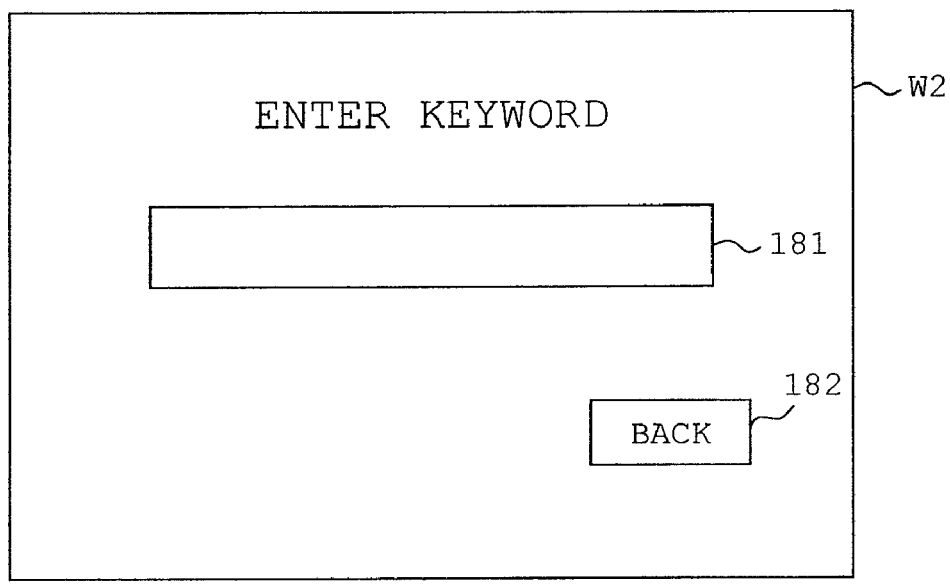
FIG. 25 illustrates an example of a keyword input window.

If the candidate condition is a keyword, a keyword input window W2 shown in FIG. 25 is illustrated on the display screen of the display unit of the computer 1 of creator 2 (step 131).

The keyword input window W2 includes a keyword display area 181 and a BACK key 182 attached characters reading "BACK". In a case where keywords have been assigned to user photo image data, mount image data, decorative image data and material image data, etc., transmitted from the scrapbook server 5 (the keyword is contained in a header attached to the image data), the assigned keyword is displayed in the keyword display area 181. By inputting a keyword from a keyboard (not shown) connected to the computer 1 (step 172), the keyword being displayed is erased and the keyword entered anew is displayed in the keyword display area 181. The entered keyword is inserted into the layer data (step 173). The new keyword is transmitted to the scrapbook server 5 and the corresponding keyword is assigned or updated for every selected user photo image, mount image, decorative image and material image.

Figure 26:
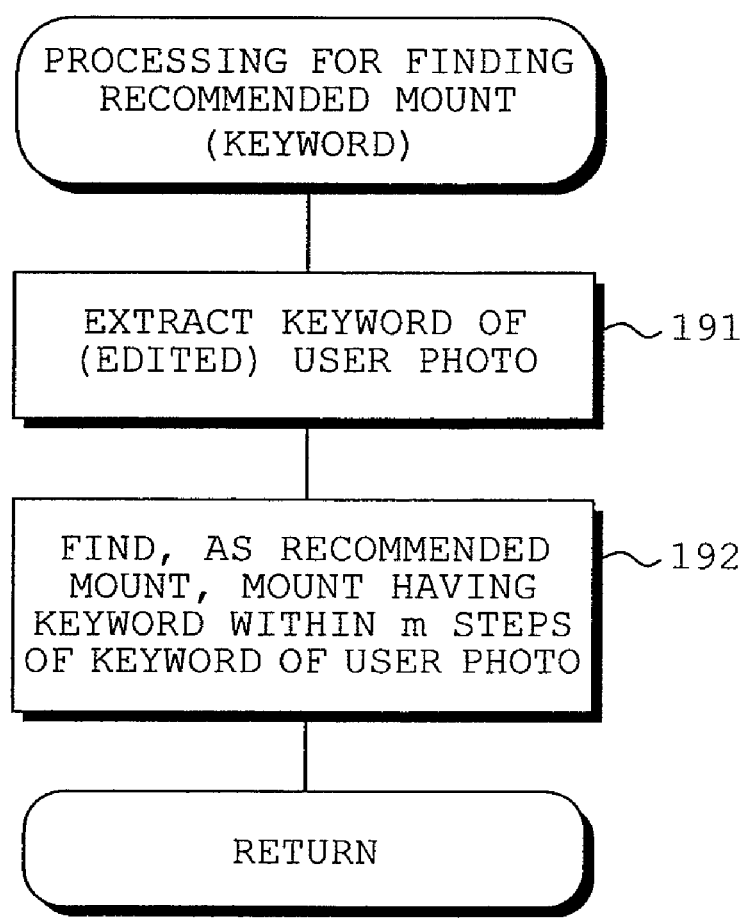
FIG. 26 is a flowchart illustrating processing for finding a recommended mount.

FIG. 26 is a flowchart illustrating processing (the processing of step 79 in FIG. 4) for finding a recommended mount in a case where the candidate condition is a keyword.

The keyword of the user photo image assigned as described above is extracted (step 191). A mount image having a keyword within m steps of the extracted keyword is found as the recommended mount (step 192). A keyword within m steps of a keyword is decided as set forth below.

Figure 27:
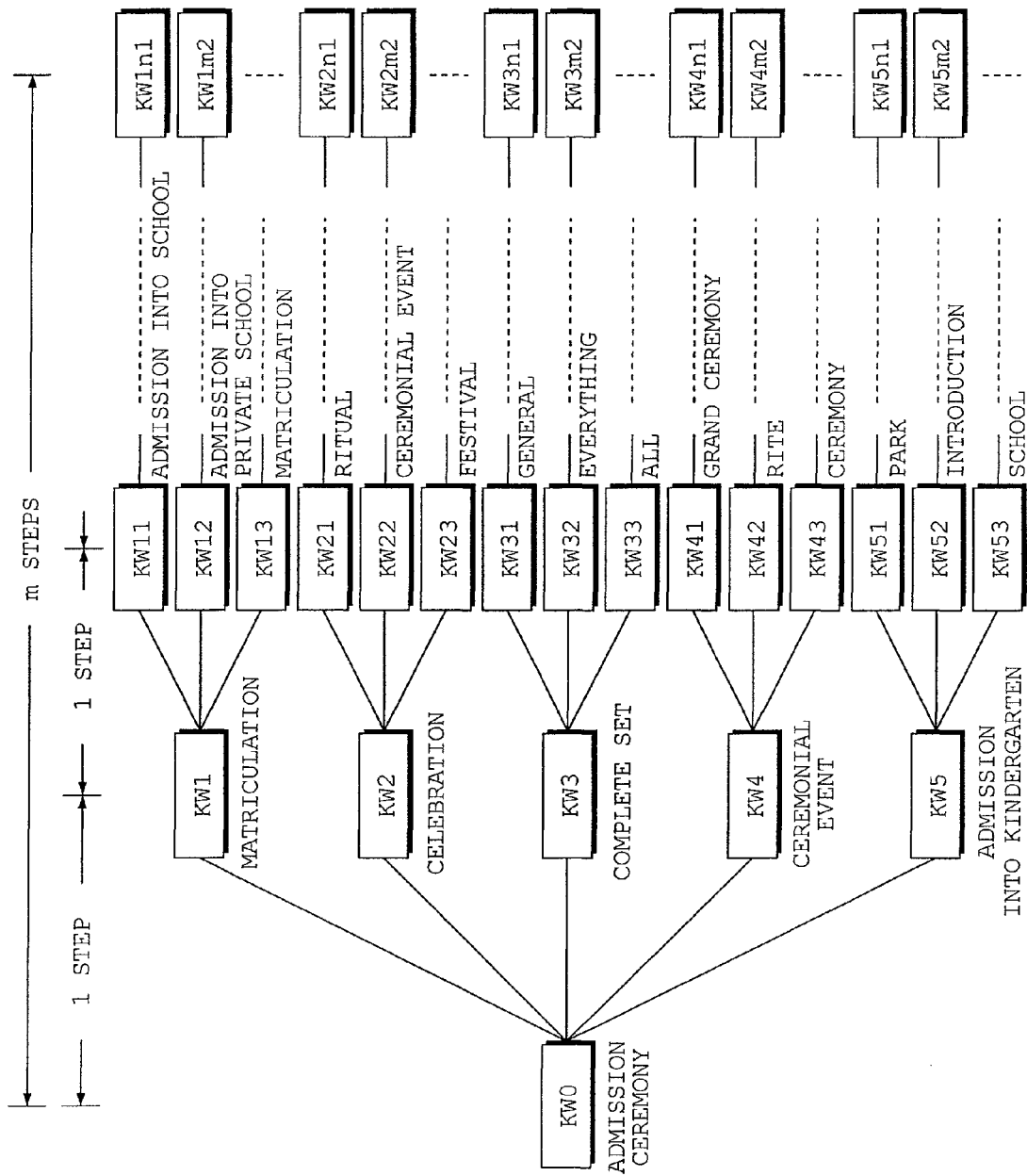
FIG. 27 illustrates a similarity relationship among keywords.

FIG. 27 illustrates a similarity relationship among keywords.

Keywords KW1 to KW5 (e.g., "MATRICULATION", "CELEBRATION", "COMPLETE SET", "CEREMONIAL EVENT", "ADMISSION INTO KINDERGARTEN") similar to a keyword KW0 (e.g., "ADMISSION CEREMONY") have been defined. Further keywords KW11 to KW13, KW21 to KW23, KW31 to KW33, KW41 to KW43 AND KW51 to KW53 (e.g., "ADMISSION TO SCHOOL", "ADMISSION TO PRIVATE SCHOOL", "RITUAL", etc.) similar to the keywords KW1 to KW5 have been defined. Similarly, further keywords similar to these keywords KW11 to KW13, KW21 to KW23, KW31 to KW33, KW41 to KW43 AND KW51 to KW53 have been defined. Thus, keywords have been stored in the scrapbook server 5 with directly analogous keywords linked. The distance between directly analogous keywords is referred to as one "step". For example, there is a distance of one step between the keyword KW0 and the keywords KW1 to KW5, and there is a distance of two steps between the keyword KW0 and the keywords KW11 to KW13, KW21 to KW23, KW31 to KW33, KW41 to KW43 AND KW51 to KW53. A mount image having a keyword within m steps becomes the recommended mount image, as mentioned above. It goes without saying that a dictionary of similar terms indicating the similarity relationship among keywords has been stored in the scrapbook server 5.

By way of example, if the keyword of a user edit image is the keyword KW0, the keywords of the mth step are keywords KW1$n$1, KW1$m$1, KW2$n$1, KW2 $m$1, etc. It will be understood that mount images having keywords between the keyword KW0 and the keywords KW1$n$1, KW1$m$1, KW2$n$1, KW2$m$1, etc., are recommended mount images.

Figure 28:
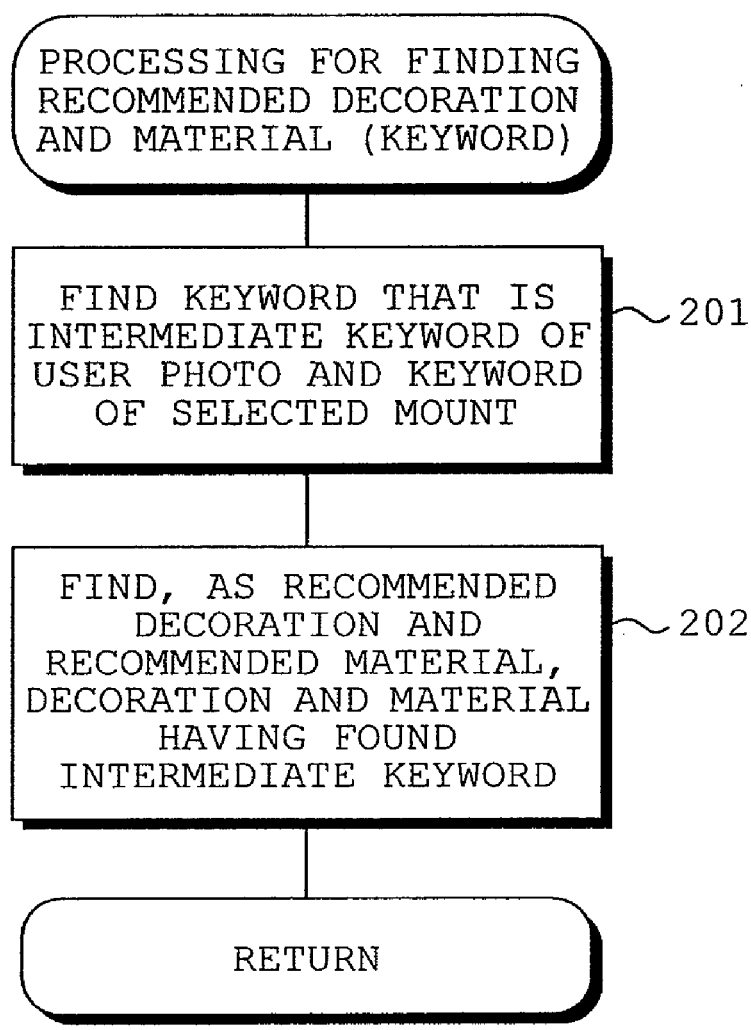
FIG. 28 is a flowchart illustrating processing for finding a recommended decoration and a recommended material.
Figure 29:
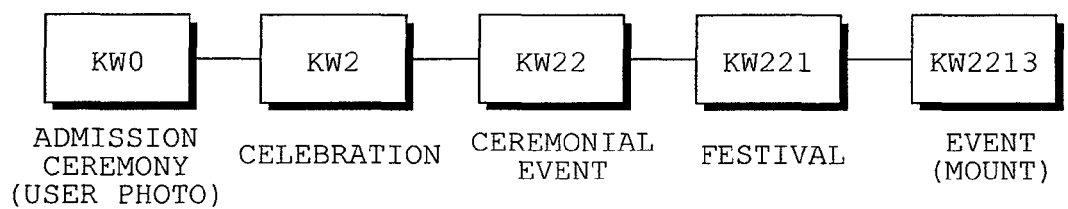
FIGS. 29 and 30 illustrate similarity relationships among keywords.

FIG. 28 is a flowchart illustrating processing (the processing of step 84 in FIG. 5) for finding a recommended decorative image and material image in a case where the candidate condition is a keyword. FIG. 29 illustrates an example of linked keywords.

As mentioned earlier, a keyword that is intermediate the keyword of a user photo image and the keyword of a selected mount image is found (step 201). Assume that the keyword of the user photo image is the keyword KW0 ("ADMISSION CEREMONY"), and that the keyword of the mount image selected by the creator 2 is the keyword KW2213. What is found is a keyword KW22 ("CEREMONY") intermediate keywords that connect the keyword KW0 and the keyword KW2213.

Next, a decorative image and a material image having a keyword that is the intermediate keyword KW22 are found as a recommended decorative image and recommended material image (step 202). If an exact intermediate keyword does not exist, then the nearest intermediate keyword is selected.

In the example shown in FIG. 29, the keyword KW0 of the user photo image and the keyword KW2213 of the mount image are determined by a single path. However, there are also cases where the keywords are determined by a plurality of paths.

Figure 30:
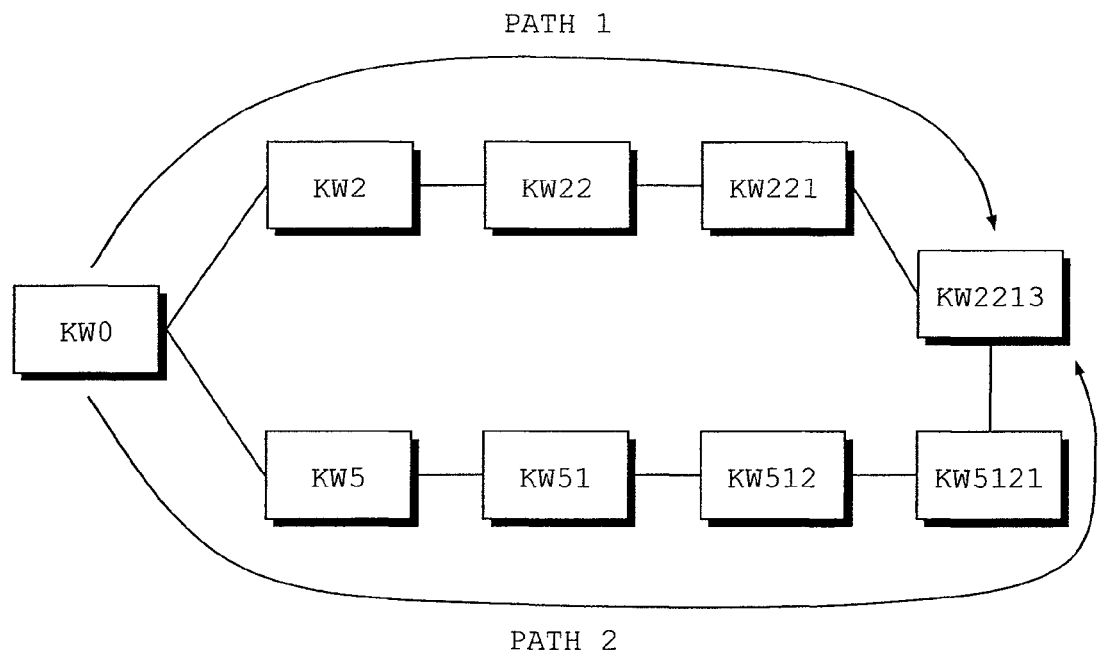

FIG. 30 illustrates how the keyword KW0 of the user photo image and the keyword KW2213 of the mount image are determined by two paths. It goes without saying that keywords may also be determined by three of more paths.

As described above, there are two paths, namely paths 1 and 2, between the keyword KW0 of the user photo image and the keyword KW2213 of the mount image. An intermediate keyword in this case involves using the shorter of these two paths. That is, the keyword KW22 that is the intermediate keyword in path 1 is the keyword of the recommended decorative image and material image.

FIGS. 31A to 31E illustrate layers. Layers can be expressed by layer data, as described above.

Figure 31:
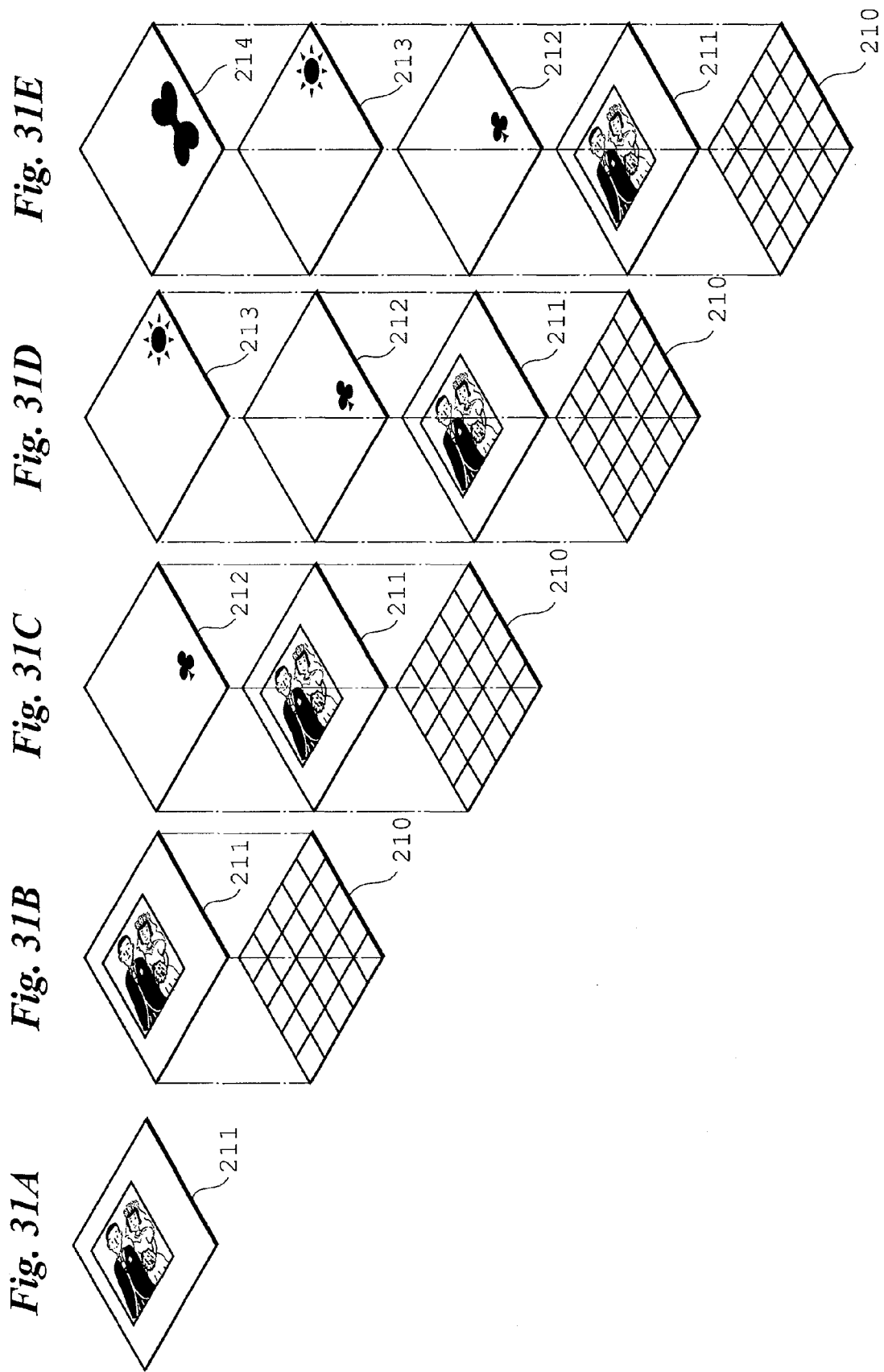
FIGS. 31A to 31E illustrate the manner in which layers are superimposed.

With reference to FIG. 31A, a layer 210 is obtained by selecting the user photo image 133. A layer 211 is obtained by selecting the mount image 132, as illustrated in FIG. 31B. By superimposing the layer 211 on the layer 210, the scrapbook edit image 131 is obtained in the manner described above. A layer 212 is obtained by selecting the decorative image 134, as illustrated in FIG. 31C, a layer 213 is obtained by selecting the material image 135, as illustrated in FIG. 31D, and a layer 214 is obtained by selecting the decorative image 135, as illustrated in FIG. 31E. By superimposing these layers 210 to 214, the scrapbook edit image 131 is obtained, as shown in FIG. 14.

Figure 32:
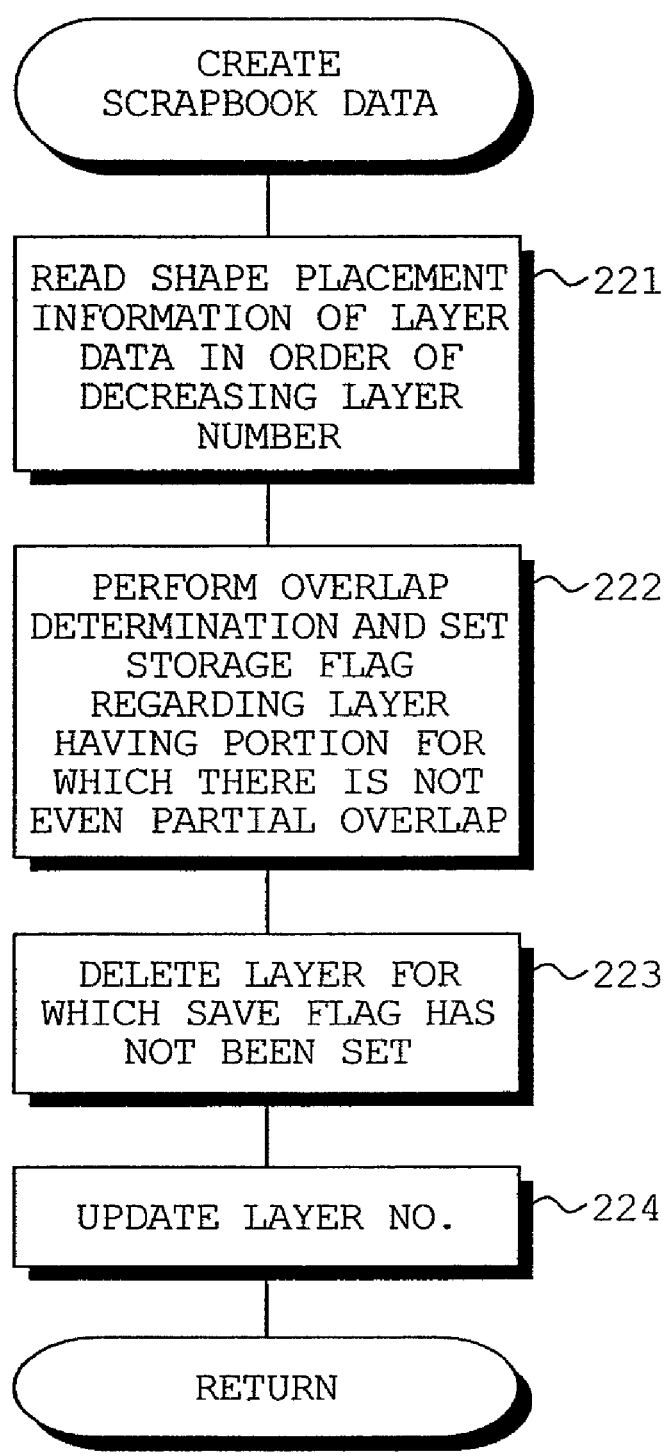
FIG. 32 is a flowchart illustrating processing for creating scrapbook data.

FIG. 32 is a flowchart illustrating processing for creating scrapbook data (step 93 in FIG. 7).

First, shape placement information of the layer data is read in order of decreasing layer number (step 221). On the basis of the read shape placement information, all layers are superimposed and a save flag is set with regard to a layer containing a part image having a portion for which there is not even partial overlap among all part images contained in all layers (step 222). With regard to a part image for which there is overlap with all part images, a save flag is not set as long as the layer containing this part image is not the uppermost layer. A layer for which the save flag has not been set is deleted (step 223). That is, the layer data corresponding to a layer for which a save flag has not been set is deleted. By deleting layer data, updating is performed in such a manner that the layer numbers become consecutive (step 224).

Figure 33:
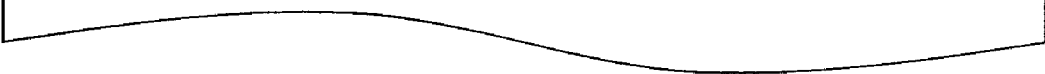
FIG. 33 illustrates an example of a procedural manual.

FIG. 33 illustrates an example of a procedural manual.

As mentioned above, a procedural manual 230 is bundled together with a mount and parts in the package delivered to the residence of the creator 2 of the scrapbook. While viewing the procedural manual 230, the creator 2 creates the scrapbook in the manner that was simulated.

The procedural manual 230 is created based upon scrapbook data. The scrapbook data is composed of a plurality of items of layer data, as mentioned above; layer data which will affix a part that will not appear on the surface of the scrapbook has been deleted. Accordingly, an operation affixing a part that will not appear on the surface of the scrapbook is not described in the procedural manual 230 even if it is an operation that was performed by the creator in the simulation. By creating the scrapbook while observing the procedural manual 230, the affixing of parts needlessly can be prevented. For example, as illustrated in FIG. 12, the decorative part 134 has been affixed to the mount image 132 in the simulation. However, since the decorative image 134 is completely hidden by the decorative image 136, as illustrated in FIG. 13, the procedural step of affixing the decorative image 134 is not set forth in the procedural manual 180.

FIGS. 34A to 34E illustrate another example of a procedural manual.

This procedural manual is referred to as a "pictorial procedural manual". This manual is similar to what would be obtained by printing, sheet by sheet whenever a part is affixed, scrapbook images generated successively in the simulation performed by the creator 2 in the manner illustrated in FIGS. 8 to 14. Naturally, the scrapbook images may actually be printed sheet by sheet whenever a part is affixed and the printed images themselves may be adopted as the pictorial procedural manual.

The pictorial procedural manual can also be created using scrapbook data. As mentioned above, scrapbook data is a set of a plurality of items of layer data, and a single sheet of a pictorial procedural manual is created by each item of layer data among the plurality of items thereof.

The layer number included in the layer data is written at the lower left of each of sheets. The layers corresponding to the sheets of the pictorial procedural manual are assumed to be color part images. However, it is assumed that the part image in the underlying layer is monochrome (it may be represented solely by an outline). For example, in the sheet of the pictorial procedural manual shown in FIG. 34C, the part image 134 is a color image, but the user image 133 is monochrome. In the sheet of the pictorial procedural manual shown in FIG. 34D, the part image 135 is a color image and the part image 134 and user image 133 are monochrome images. In the sheet of the pictorial procedural manual shown in FIG. 34E, the part image 136 is a color image and the part images 133 to 135 are monochrome images. Since the part image of an underlying layer is not a color image but is represented by a monochrome image, which part corresponding to a part image should be affixed above can be determined at a glance.

Figure 35:
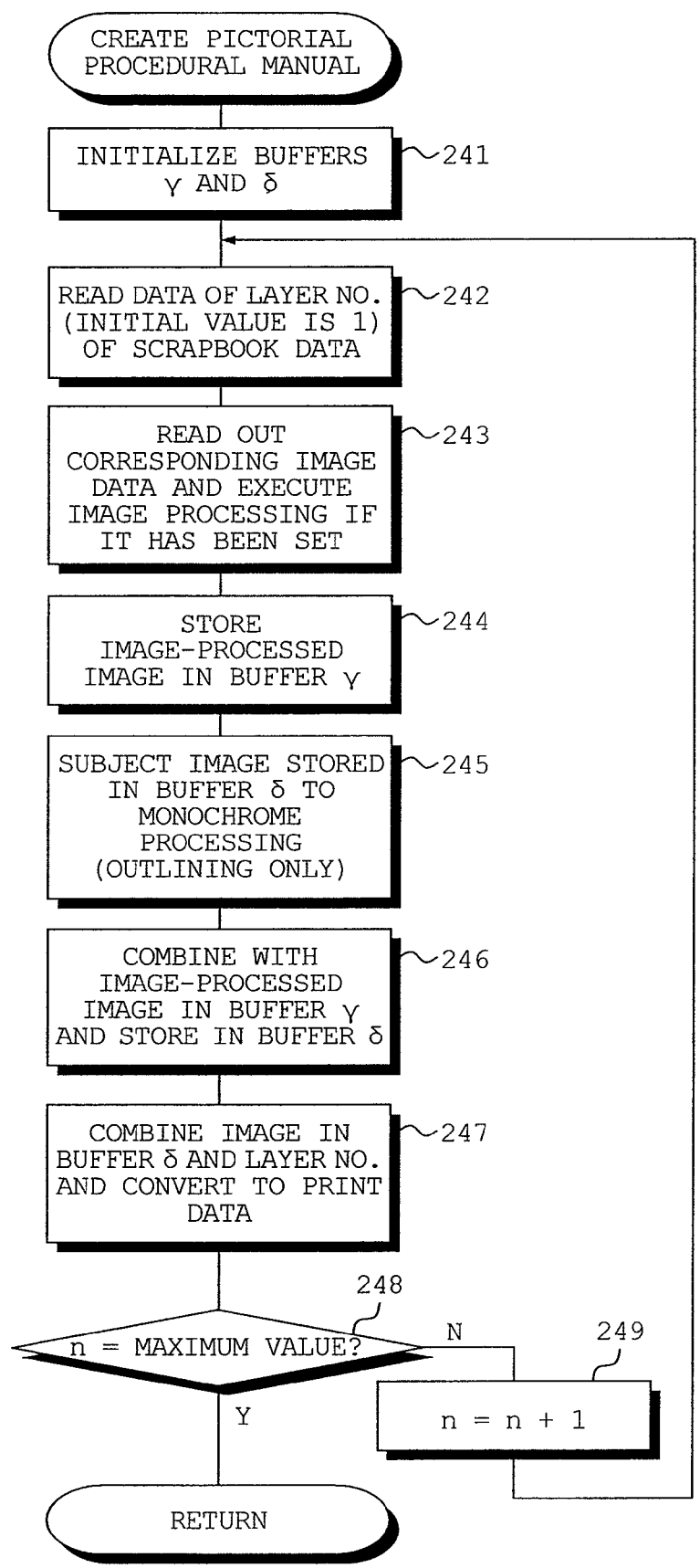
FIG. 35 is a flowchart illustrating processing for creating a pictorial procedural manual.

FIG. 35 is a flowchart illustrating processing for creating a pictorial procedural manual.

The above-described pictorial procedural manual is such that the part image contained in the upper layer of a superimposed layer is in color, while a part image contained in the underlying layer is monochrome (or an outline only). For this reason, there are defined a buffer γ (a prescribed first memory area of memory 13) for temporarily storing image data representing a color part image contained in an upper layer, and a buffer δ (a prescribed second memory area of memory 13) for temporarily storing image data representing a monochrome part image. The buffers ι and δ are initialized (step 241).

Layer data of layer number n (the initial value of n is 1) is read from among the layer data constituting the scrapbook data (step 242). Image data representing a part image contained in a layer specified by the read layer data is read, and image processing is executed in a case where image processing such as color processing has been set for this part image (step 243). The image data that has undergone image processing is stored in buffer γ (step 244). The layer of layer number 1 is the layer 241 overlying layer 210 of the mount, as illustrated in FIG. 31B. If color processing has been set for the part image 133 contained in layer 240, then image processing is applied to the image data representing the part image 133 and the processing data is stored in buffer δ.

The image data that has been stored in buffer δ is subjected to monochrome processing (or outlining processing for producing only an outline) (step 245). The monochrome part image represented by the image data that has been stored in buffer δ is combined with the layer containing the image-processed color part image represented by the image data that has been stored in buffer δ and the result is stored in buffer γ (step 246). The layer number is combined with the layer that has been stored in buffer γ and the result is converted to print data (step 247). One sheet of the pictorial procedural manual is obtained by this print data. If the part image contained in the layer of layer number 1 has been subjected to image processing, image data will not have been stored in buffer δ. As illustrated in FIG. 34B, therefore, a sheet of the pictorial procedural manual on which a part image has been affixed to the mount image is obtained.

The processing of steps 242 to 247 is repeated while incrementing the layer number until layer number n takes on the maximum value ("NO" at step 248). If the above-mentioned processing is executed, a superimposed layer of the kind shown in FIG. 24B will have been stored in buffer β. The part image 133 contained in this layer is made monochrome (the mount image 132 also is made monochrome if necessary) and this is combined with the color part image 134 contained in the upper layer, whereby the sheet of the pictorial procedural manual shown in FIG. 34C is obtained. Similarly, the sheets of the pictorial procedural manual, in which the part image 135 is in color and the other part images 133 and 134 are monochrome, as illustrated in FIG. 34D, and in which the part image 136 is in color and the other part images 133 and 135 are monochrome, as illustrated in FIG. 34E, are obtained.

In the pictorial procedural manual described above, the part image contained in the uppermost layer is assumed to be a color image and the part images contained in the underlying layers are assumed to be monochrome. However, the results of printing the scrapbook edit image illustrated in FIGS. 7 to 14 may just as well be adopted as the pictorial procedural manual.

In the above-described embodiment, a user photo image, mount image, decorative image and material image, the positions thereof and the image processing (edit processing) of each can be changed during the course of operation until the simulation ends. If a change has been made, the scrapbook server 5 would save a history of the change. Further, it may be so arranged that a recommended mount image, recommended decorative image and recommended material image that are similar in terms of shape or geometrical pattern are displayed. For example, if a mount image depicted by a star-shaped pattern has been selected, then a star-shaped decorative image and material image may be recommended. If a mount image having a check pattern has been selected, then a check-patterned decorative image and material image may be recommended.

A recommended mount image, recommended decorative image and recommended material image may be ones that have been selected often by other creators (i.e., images having a high popularity ranking). A recommended mount image, recommended decorative image and recommended material image may be obtained by searching registered keywords, may be decided based upon predetermined combination or may be made to conform to the season or to an advertising campaign, etc. Further, a decorative image and a material image having a high frequency of selection among decorative images and material images created by another creator may be recommended in a case where the same mount image has been selected. In this case, the frequency of selection of a decorative image and material image would be recorded beforehand in correspondence with the mount image.

Furthermore, in a case where there are another decorative image and material image for which the frequency of selection is high and these are selected in a case where a certain single decorative image and certain single material image have been selected, this other decorative image and material image may be recommended if the certain single decorative image and certain single material image have been selected. Further, the same creator may recommend a decorative image and material image that were selected in a previous simulation or in an immediately preceding simulation.

As many apparently widely different embodiments of the present invention can be made without departing from the spirit and scope thereof, it is to be understood that the invention is not limited to the specific embodiments thereof except as defined in the appended claims.

What is claimed is:

1. A server for combining images, comprising:

a user image identification data receiving device for receiving data identifying a user image, which has been selected by a client computer from among a number of user images obtained by sensing the images of subjects and has been transmitted from the client computer;

a mount image search device for finding, by a search among a number of mount images, a plurality of mount images recommended as mount images of the user image identified by the user image identification data received by said user image identification data receiving device;

a mount image data transmitting device for transmitting mount image data, which represents the plurality of mount images found by said mount image search device, to the client computer;

a mount identification data receiving device for receiving mount identification data transmitted from the client computer, this data identifying a mount image that has been selected by the client computer from among the plurality of mount images, in response to transmission of the mount image data from said mount image data transmitting device to the client computer;

a part image search device for finding, by a search among a number of part images, a plurality of part images recommended as part images to be combined with an image that is a combination of the user image identified by the user image identification data received by said user image identification data receiving device and the mount image identified by the mount identification data received by said mount identification data receiving device;

a part image data transmitting device for transmitting part image data, which represents the plurality of part images found by said part image search device, to the client computer; and further comprising a part image data receiving device, responsive to application of image transformation processing such as cropping and color conversion or designation of position by the client computer to a part image represented by part image data that has been transmitted to the client computer by said part image data transmitting device, for receiving part image data that has undergone the image transformation processing, or designated position data, transmitted from the client computer.

2. The server according to claim 1, further comprising a user image data receiving device, responsive to application of image transformation processing such as cropping and color conversion by the client computer to a user image that is identified by said user image identification data receiving device, for receiving the user image data that has undergone the image transformation processing transmitted from the client computer;

wherein said mount image search device finds, by a search among a number of mount images, a plurality of mount images recommended as mount images of a user image represented by the user image data that has undergone the image transformation processing received by the user image data receiving device; and said part image search device finds, by a search among a number of part images, a plurality of part images recommended as part images to be combined with an image that is a combination of the user image represented by user image data received by said user image data receiving device and the mount image identified by said mount identification data receiving device.

3. The server according to claim 1, further comprising a user image keyword receiving device for receiving a user image keyword transmitted from the client computer, said user image keyword having been input by the user of the client computer with regard to a user image selected by the client computer and having been transmitted from the client computer to the server;

wherein keywords have been assigned to respective mount images of the number of mount images, and based upon a user image keyword received by said user image keyword receiving device and mount keywords that have been assigned to mount images, said mount image search device finds, by a search, a plurality of mount images recommended as mount images of the user image identified by the user image data received by said user image identification data receiving device; and keywords have been assigned to respective part images of the number of part images, and based upon a user image keyword received by said user image keyword receiving device, a mount keyword that has been assigned to a mount image and part keywords that have been assigned to part images, said part image search device finds, by a search, a plurality of part images recommended as part images to be further combined with the mount image.

4. The server according to claim 1, further comprising a mount image data receiving device, responsive to application of image transformation processing such as cropping and color conversion by the client computer to a mount image that has been selected by the client computer from among a plurality of mount images, for receiving the mount image data that has undergone the image transformation processing transmitted from the client computer;

wherein said part image search device finds, by a search among a number of part images, a plurality of part images recommended as part images to be combined with an image that is a combination of the user image identified by the user image identification data received by said user image identification data receiving device and the mount image received by said mount image data receiving device.

5. The server according to claim 3, further comprising a mount keyword receiving device for receiving a mount keyword transmitted from the client computer, said mount keyword having been input by the user of the client computer with regard to a mount image selected by the client computer and having been transmitted from the client computer to the server;

wherein keywords have been assigned to respective part images of the number of part images, and based upon a mount keyword received by said mount keyword receiving device, a user image keyword received by said user image keyword receiving device and part keywords that have been assigned to part images, said part image search device finds, by a search, a plurality of part images recommended as parts images to be further combined with the mount image.

6. The server according to claim 1, further comprising a part keyword receiving device for receiving a part keyword, which corresponds to the part image, transmitted from the client computer; and a part image keyword assigning device for appending the part keyword, which has been received by said part keyword receiving device, to the corresponding part image.

7. The server according to claim 1, wherein said mount image search device finds, as a recommended mount image from among a number of mount images, a mount image having an average value of color that approximates an average value of color of a user image identified by user image identification data received by said user image identification data receiving device.

8. The server according to claim 1, wherein said part image search device finds, as a recommended part image from among a number of part images, a part image having an average value of color that approximates an average value of color of a user image identified by user image identification data received by said user image identification data receiving device and an average value of color of a mount image identified by mount identification data received by said mount identification data receiving device.

9. A method of controlling a server for combining images, comprising the steps of:

receiving, by a user image identification data receiving device, user image identification data for identifying a user image, which has been selected by the client computer from among a number of user images obtained by sensing the images of subjects and has been transmitted from the client computer;

finding, by a mount image search device, by a search among a number of mount images, a plurality of mount images recommended as mount images of a user image represented by user image identification data received by the user image data receiving device;

transmitting to the client computer, by a mount image data transmitting device, mount image data representing the plurality of mount images found by the mount image search device;

receiving, by a mount identification data receiving device, mount identification data transmitted from the client computer, this data identifying a mount image that has been selected by the client computer from among the plurality of mount images, in response to transmission of the mount image data from the mount image data transmitting device to the client computer;

finding, by a part image search device, by a search among a number of part images, a plurality of part images recommended as part images to be combined with an image that is a combination of the user image identified by the user image identification data received by the user image identification data receiving device and the mount image identified by the mount identification data received by the mount identification data receiving device;

transmitting to the client computer, by a part image data transmitting device, part image data representing the plurality of part images found by the part image search device; and further comprising receiving part image data that has undergone the image transformation processing, or designated position data, transmitted from the client computer, receiving image being responsive to application of image transformation processing such as cropping and color conversion or designation of position by the client computer to a part image represented by part image data that has been transmitted to the client computer by said part image data transmitting step.

* * * * *